US012609536B2

(12) United States Patent
Ren et al.

(10) Patent No.: US 12,609,536 B2
(45) Date of Patent: Apr. 21, 2026

(54) POWER UNIT AND SOLID-STATE TRANSFORMER

(71) Applicant: Huawei Digital Power Technologies Co., Ltd., Shenzhen (CN)

(72) Inventors: Biao Ren, Shenzhen (CN); Zhuyong Huang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 185 days.

(21) Appl. No.: 18/428,259

(22) Filed: Jan. 31, 2024

(65) Prior Publication Data

US 2024/0186799 A1　Jun. 6, 2024

Related U.S. Application Data

(63) Continuation of application No. PCT/CN2022/109353, filed on Aug. 1, 2022.

(30) Foreign Application Priority Data

Aug. 3, 2021　(CN) .......................... 202110887823.0

(51) Int. Cl.
　*H02J 4/00*　(2026.01)
(52) U.S. Cl.
　CPC ..................................... *H02J 4/00* (2013.01)
(58) Field of Classification Search
　CPC ........ H02J 4/00; H02M 1/0006; H02M 1/007; H02M 1/4225; H02M 3/01; H02M 3/156;

H02M 3/33571; H02M 3/33576; H02M 5/458; H02M 7/06; H02M 7/219; H02M 1/0074; H02M 3/33561; H02M 1/32;

(Continued)

(56) References Cited

U.S. PATENT DOCUMENTS 9,444,388 B2　9/2016　Chae
10,270,355 B1 *　4/2019　Xiong ................. H02M 5/4585

(Continued)

FOREIGN PATENT DOCUMENTS

CN　　101834541 A　　9/2010
CN　　201656756 U　　11/2010

(Continued)

*Primary Examiner* — Daniel Cavallari
*Assistant Examiner* — Terrence R Willoughby
(74) *Attorney, Agent, or Firm* — Maier & Maier, PLLC

(57) ABSTRACT

A power unit and a solid-state transformer supply power to a control module in the power unit by using a first subsidiary power supply circuit and a second subsidiary power supply circuit and improve operation reliability of the power unit. The power unit may include the first subsidiary power supply circuit and a first power circuit. The first power circuit includes an alternating current/alternating current power main circuit and a first control module. The alternating current/alternating current power main circuit is coupled to a grid power supply system to supply power to the alternating current/alternating current power main circuit through the grid power supply system. An input end of the first subsidiary power supply circuit is coupled to a bus of the alternating current/alternating current power main circuit. An output end of the first subsidiary power supply circuit is coupled to the first control module.

20 Claims, 17 Drawing Sheets

(58) Field of Classification Search
CPC .. H02M 3/33569; H02M 5/4585; H02M 7/02; H02H 11/002
See application file for complete search history.

(56) References Cited

U.S. PATENT DOCUMENTS

| | | | |
|---|---|---|---|
| 2003/0227785 A1* | 12/2003 | Johnson, Jr. .............. | H02J 9/06 363/37 |
| 2020/0006970 A1 | 1/2020 | Chen et al. | |
| 2020/0403493 A1 | 12/2020 | Ljushev | |

FOREIGN PATENT DOCUMENTS

| | | | |
|---|---|---|---|
| CN | 202435269 U | 9/2012 | |
| CN | 210007623 U | 1/2020 | |
| CN | 112187052 A | 1/2021 | |
| CN | 112564508 A | 3/2021 | |
| CN | 213185554 U | 5/2021 | |
| CN | 113726177 A | 11/2021 | |
| WO | 2020085264 A1 | 4/2020 | |

* cited by examiner

POWER UNIT AND SOLID-STATE TRANSFORMER

CROSS-REFERENCE TO RELATED APPLICATIONS

This application is a continuation of International Application No. PCT/CN2022/109353, filed on Aug. 1, 2022, which claims priority to Chinese Patent Application No. 202110887823.0, filed on Aug. 3, 2021. The disclosures of the aforementioned applications are hereby incorporated by reference in their entireties.

TECHNICAL FIELD

The embodiments relate to the field of power electronics technologies, a power unit, and a solid-state transformer.

BACKGROUND

A solid-state transformer (SST), also referred to as a power electronics transformer (EPT), is a stationary electrical device for converting power of one power characteristic into power of another power characteristic (for example, implementing voltage conversion and power transfer) by using a combination of a power electronics conversion technology and a high-frequency power conversion technology that is based on a principle of electromagnetic induction. Compared with a conventional power transformer, the solid-state transformer SST is smaller in size, can maintain stability of an output voltage, and can improve an input power factor and a current harmonics indicator.

After the solid-state transformer SST is applied to a power system, power quality of the power system and stability of the power system can be improved, and a flexible power transmission mode and real-time power flow control in a power market can be implemented. Therefore, the solid-state transformer SST has become one of main research objects in the power system.

Because a power unit in the solid-state transformer SST includes a control module configured to implement functions such as control and driving of power components in the power unit, how to supply power to the control module becomes an urgent problem to be resolved.

SUMMARY

The embodiments provide a power unit and a solid-state transformer, to supply power to a control module in the power unit and improve operation reliability of the control module.

According to a first aspect, an embodiment provides a power unit. The power unit may include a first subsidiary power supply circuit and a first power circuit. The first power circuit includes an alternating current (AC) or alternating current AC (AC/AC) power main circuit and a first control module coupled to the AC/AC power main circuit.

Optionally, an input end of the first subsidiary power supply circuit is coupled to a bus of the AC/AC power main circuit, an output end of the first subsidiary power supply circuit is coupled to the first control module, the AC/AC power main circuit includes an input end and an output end, and the input end of the AC/AC power main circuit is coupled to a grid power supply system (which may be a power distribution system or a power transmission system).

Based on the foregoing coupling relationship, the AC/AC power main circuit may be configured to adjust a first voltage (which may be represented by $V_1$) from the grid power supply system to a second voltage (which may be represented by $V_2$), and output the second voltage (which may be output to a transformer (that is, a first transformer) in the power unit) through the output end of the AC/AC power main circuit.

Further, the first control module may be configured to detect at least one of a status of the AC/AC power main circuit or information of the AC/AC power main circuit and drive the AC/AC power main circuit based on at least one of the status or information of the AC/AC power main circuit (may drive a switching transistor in the AC/AC power main circuit).

Further, the first subsidiary power supply circuit may be configured to adjust a voltage (which may be represented by $V_{bus}$) of the bus of the AC/AC power main circuit to a third voltage (which may be represented by $V_3$), and output the third voltage to the first control module (that is, the first subsidiary power supply circuit supplies power to the first control module). The third voltage $V_3$ may be used to indicate a direct current voltage required by the first control module.

It should be noted that the status of the AC/AC power main circuit may be a status of the switching transistor in the AC/AC power main circuit (such as a triode or an insulated gate bipolar transistor (IGBT), including ON and OFF. The information of the AC/AC power main circuit may include at least one of an input voltage, an input current, an output voltage, or an output current of the AC/AC power main circuit.

The power unit can reliably supply power to the first control module in the first power circuit by using the first subsidiary power supply circuit, thereby improving operation reliability of the first control module. In addition, because no isolation device needs to be disposed separately, power supply costs of the first control module are reduced, and a size of the power unit is reduced.

In a possible implementation, the power unit may further include a first transformer (such as a high frequency transformer) and a second power circuit, the second power circuit may include an alternating current AC or direct current (DC) power main circuit (AC/DC) and a second control module coupled to the AC/DC power main circuit, and the AC/DC power main circuit may include an input end and an output end.

Optionally, an input end of the first transformer is coupled to the output end of the AC/AC power main circuit, and an output end of the first transformer is coupled to the input end of the AC/DC power main circuit.

Based on the foregoing coupling relationship, the first transformer may be configured to adjust the second voltage $V_2$ to a fourth voltage (which may be represented by $V_4$) and output the fourth voltage to the AC/DC power main circuit. The fourth voltage $V_4$ may be used to indicate an alternating current voltage required by the AC/DC power main circuit.

Further, the AC/DC power main circuit is configured to rectify the fourth voltage $V_4$ into a fifth voltage (which may be represented by $V_5$) and output the fifth voltage (which may be output to a second subsidiary power supply circuit) through the output end of the AC/DC power main circuit. The fifth voltage $V_5$ may be used to indicate a direct current voltage output by the AC/DC power main circuit.

Further, the second control module may be configured to detect at least one of a status or information of the AC/DC power main circuit and drive the AC/DC power main circuit based on at least one of the status or information of the AC/DC power main circuit.

For example, the status of the AC/DC power main circuit may be a status (including ON and OFF) of a switching transistor (such as a triode or an IGBT) in the AC/DC power main circuit. The information of the AC/DC power main circuit may include at least one of an input voltage, an input current, an output voltage, or an output current of the AC/DC power main circuit.

It should be noted that a voltage value of the first power circuit may be higher than a voltage value of the second power circuit. Because an input of the first power circuit may be an alternating current from the grid power supply system, and an output of the first power circuit is also an alternating current, the first power circuit may be referred to as an alternating current conversion circuit. In addition, the input of the first power circuit may be a high voltage (for example, a voltage above 35 kV and below 220 kV) or a medium voltage (for example, a voltage above 1 kV and is 35 kV or below 35 kV). Therefore, the first power circuit may also be referred to as a high voltage power circuit or a medium voltage power circuit.

It should also be noted that, because an output end of the first power circuit is coupled to the input end of the first transformer, and the output end of the first transformer is coupled to an input end of the second power circuit, it can be determined that the first transformer converts a high voltage or a medium voltage from the first power circuit into a low voltage (for example, a voltage below 1 kV, also an alternating current voltage). Further, the second power circuit converts the low voltage obtained through conversion by the first transformer into a direct current voltage (the direct current voltage is also a low voltage). Therefore, the second power circuit may be referred to as a low voltage power circuit.

Conversion and transmission from the input to the output of the power unit are implemented by using the AC/AC power main circuit, the first transformer, and the AC/DC power main circuit. In addition, reliable driving of the switching transistor in the AC/AC power main circuit is implemented by using the first control module, and reliable driving of the switching transistor in the AC/DC power main circuit is implemented by using the second control module. Therefore, reliability of the AC/DC power main circuit and the AC/AC power main circuit is improved.

In an example, the first control module may include a first detection circuit, a first communication circuit, a first control circuit, and a first drive circuit.

Optionally, an input end of the first detection circuit may be coupled to the AC/AC power main circuit, an output end of the first detection circuit may be coupled to an input end of the first control circuit, an output end of the first control circuit may be coupled to an input end of the first drive circuit, an output end of the first drive circuit may be coupled to the AC/AC power main circuit, the first control circuit may be further coupled to the first communication circuit, and the first communication circuit is coupled to the second control module.

Based on the foregoing coupling relationship, it may be further determined that:

the first detection circuit may be configured to detect at least one of the status or information of the AC/AC power main circuit.

The first control circuit may be configured to transmit at least one of the status or information of the AC/AC power main circuit to the first communication circuit.

The first communication circuit may be configured to transmit at least one of the status or information of the AC/AC power main circuit to the second control module and transmit at least one of the status or information of the AC/DC power main circuit from the second control module to the first control circuit.

After the first communication circuit transmits the status and/or information of the AC/DC power main circuit and the status and/or information of the AC/AC power main circuit (that is, at least one of the status of the AC/DC power main circuit, the information of the AC/DC power main circuit, the status of the AC/AC power main circuit, and the information of the AC/AC power main circuit) to the first control circuit, the first control circuit may be further configured to send a first control command to the first drive circuit based on at least one of the status or information of the AC/DC power main circuit or at least one of the status or information of the AC/AC power main circuit.

The first drive circuit may be configured to drive the AC/AC power main circuit based on the first control command.

The first control module can not only drive the switching transistor in the AC/AC power main circuit by using at least one of the status or information of the AC/DC power main circuit or at least one of the status or information of the AC/AC power main circuit, but also transmit at least one of the status or information of the AC/AC power main circuit to the second control module, to provide a basis for the second control module to implement reliable driving of the switching transistor in the AC/DC power main circuit.

In another example, the second control module may include a second detection circuit, a second communication circuit, a second control circuit, and a second drive circuit.

Optionally, an input end of the second detection circuit may be coupled to the AC/DC power main circuit, an output end of the second detection circuit may be coupled to an input end of the second control circuit, an output end of the second control circuit may be coupled to an input end of the second drive circuit, an output end of the second drive circuit may be coupled to the AC/DC power main circuit, the second control circuit is further coupled to the second communication circuit, and the second communication circuit is coupled to the first communication circuit.

Based on the foregoing coupling relationship, it may be further determined that:

the second detection circuit may be configured to detect at least one of the status or information of the AC/DC power main circuit.

The second control circuit may be configured to transmit at least one of the status or information of the AC/DC power main circuit to the second communication circuit.

The second communication circuit may be configured to transmit at least one of the status or information of the AC/DC power main circuit to the first control module and transmit at least one of the status or information of the AC/AC power main circuit from the first communication circuit to the second control circuit.

After the second communication circuit transmits at least one of the status or information of the AC/AC power main circuit or at least one of the status or information of the AC/DC power main circuit to the second control circuit, the second control circuit is further configured to send a second control command to the second drive circuit based on the status and/or information of the AC/AC power main circuit and the status and/or information of the AC/DC power main circuit (that is, at least one of the status of the AC/DC power main circuit, the information of the AC/DC power main circuit, the status of the AC/AC power main circuit, and the information of the AC/AC power main circuit).

The second drive circuit may be configured to drive the AC/DC power main circuit based on the second control command.

The second control module may not only drive the switching transistor in the AC/DC power main circuit by using at least one of the status or information of the AC/DC power main circuit or at least one of the status or information of the AC/AC power main circuit, but also transmit at least one of the status or information of the AC/DC power main circuit to the first control module, to provide a basis for the first control module to implement reliable driving of the switching transistor in the AC/AC power main circuit.

It may be understood that communication is required between the first control module and the second control module, and communication between the first control module and the second control module is implemented by using the first communication circuit and the second communication circuit. In addition, the first control circuit needs to deliver the first control command to the first drive circuit not only based on at least one of the status or information of the AC/DC power main circuit that is detected by the second detection circuit, but also based on at least one of the status or information of the AC/AC power main circuit that is detected by the first detection circuit and is from the first communication circuit.

Similar to the first control circuit, the second control circuit needs to deliver the second control command to the second drive circuit not only based on at least one of the status or information of the AC/DC power main circuit that is detected by the second detection circuit, but also based on at least one of the status or information of the AC/AC power main circuit that is detected by the first detection circuit and is from the first communication circuit.

In other words, the first power circuit needs to control the switching transistor in the AC/AC power main circuit in the first power circuit based on the status of the switching transistor in the AC/AC power main circuit in the first power circuit and the information (at least one of voltage or current) of the AC/AC power main circuit, and the status of the switching transistor in the AC/DC power main circuit in the second power circuit and the information (at least one of voltage or current) of the AC/DC power main circuit.

Similar to the first power circuit, the second power circuit needs to control the switching transistor in the AC/DC power main circuit in the second power circuit based on the status of the switching transistor in the AC/DC power main circuit in the second power circuit and the information (at least one of voltage or current) of the AC/DC power main circuit, and the status of the switching transistor in the AC/AC power main circuit in the first power circuit and the information (at least one of voltage or current) of the AC/AC power main circuit.

In a possible implementation, the first subsidiary power supply circuit may include a first voltage conversion module and a first rectifier module.

Optionally, an input end of the first voltage conversion module may be coupled to a bus of the power unit (one power unit includes one bus), an output end of the first voltage conversion module may be coupled to an input end of the first rectifier module, and an output end of the first rectifier module may be coupled to the first control module.

Based on the foregoing coupling relationship, the first voltage conversion module may be configured to convert a voltage of the bus of the power unit into a sixth voltage (which may be represented by $V_6$) and output the sixth voltage to the first rectifier module. The sixth voltage $V_6$ may be used to indicate an alternating current voltage output by the first voltage conversion module.

Further, the first rectifier module may be configured to rectify the sixth voltage $V_6$ into the third voltage $V_3$ and output the third voltage to the first control module, to supply power to the first control module.

It may be understood that, because an input of the power unit is a medium voltage (an alternating current), and an output of the power unit is a low voltage (a direct current), and because the input end of the first subsidiary power supply circuit is coupled to the bus of the corresponding power unit, the first subsidiary power supply circuit may be referred to as a medium voltage subsidiary power supply circuit. In addition, because the first subsidiary power supply circuit supplies power to the first control module based on the voltage of the bus of the power unit, the first control module may also be referred to as a medium voltage control module.

The first voltage conversion module and the first rectifier module adjust the voltage of the bus of the power unit to a voltage required by the first control module, thereby reliably supplying power to the first control module. Because no other isolation device needs to be disposed separately, the power supply costs of the first control module are reduced. Because the first subsidiary power supply circuit is located inside the power unit, the size of the power unit is also reduced.

According to a second aspect, the embodiment further provides a solid-state transformer. The solid-state transformer may include a second subsidiary power supply circuit and a plurality of power units.

Optionally, input ends of all of the plurality of power units may be connected in series to form an input end of the solid-state transformer. Output ends of all of the plurality of power units may be connected in parallel to form an output end of the solid-state transformer.

An input end of the second subsidiary power supply circuit may be coupled to the output end of the AC/DC power main circuit, and an output end of the second subsidiary power supply circuit is coupled to the second control module.

Based on the foregoing coupling relationship, the second subsidiary power supply circuit may be configured to adjust the fifth voltage $V_5$ to a seventh voltage (which may be represented by $V_7$) and output the seventh voltage to the second control module (that is, supply power to the second control module). The seventh voltage $V_7$ may be used to indicate a direct current voltage required by the second control module.

It should be noted that, because each power unit includes one first subsidiary power supply circuit, a quantity of first subsidiary power supply circuits is equal to a quantity of power units and is equal to a quantity of first control modules. In addition, because the input end of the first subsidiary power supply circuit in each power unit is coupled to the bus of the corresponding power unit, and the output end of the first subsidiary power supply circuit in each power unit is coupled to the corresponding first control module, for the solid-state transformer, the first subsidiary power supply circuit is of a distributed structure.

It should also be noted that the second subsidiary power supply circuit supplies power to each second control module in the plurality of power units. Therefore, for the solid-state transformer, the second subsidiary power supply circuit is of a centralized structure.

Power is reliably supplied to the second control module in the second power circuit by using the second subsidiary power supply circuit, physical isolation is implemented between the second subsidiary power supply circuit of the centralized structure and the first subsidiary power supply circuit of the distributed structure, and no additional isolation device needs to be disposed for the first subsidiary power supply circuit and the second subsidiary power supply circuit. Therefore, costs of the solid-state transformer are reduced, and a size of the solid-state transformer is reduced.

In a possible implementation, the second subsidiary power supply circuit may include a second transformer and a first subsidiary power supply module.

Optionally, an input end of the second transformer may be coupled to the grid power supply system, an output end of the second transformer may be coupled to an input end of the first subsidiary power supply module, the input end of the first subsidiary power supply module may be further coupled to the output end of the AC/DC power main circuit, and an output end of the first subsidiary power supply module may be coupled to the second control module.

Based on the foregoing coupling relationship, the second transformer may be configured to adjust the first voltage $V_1$ to an eighth voltage (which may be represented by $V_8$) and output the eighth voltage to the first subsidiary power supply module (that is, supply power to the first subsidiary power supply module). The eighth voltage $V_8$ may be used to indicate an alternating current voltage required by the first subsidiary power supply module.

Further, the first subsidiary power supply module may be configured to adjust the fifth voltage $V_5$ and the eighth voltage $V_8$ to the seventh voltage $V_7$ and output the seventh voltage to the second control module (that is, supply power to the second control module).

It should be noted that, the first voltage $V_1$ may be a high-voltage alternating current or a medium-voltage alternating current, and the eighth voltage $V_8$ may be a low-voltage alternating current. Therefore, a voltage value of the first voltage may be greater than a voltage value of the second voltage. In other words, the second transformer implements a step-down function, that is, the first voltage $V_1$ (high voltage or medium voltage) from the grid power supply system may be stepped down to the eighth voltage $V_8$ (low voltage) by using the second transformer.

It may be understood that regardless of whether the second transformer converts the high-voltage alternating current from the grid power supply system into the low-voltage alternating current or converts the medium-voltage alternating current from the grid power supply system into the low-voltage alternating current, the second transformer implements the step-down function. The first subsidiary power supply module supplies power to the second control module based on the low-voltage alternating current obtained through conversion by the second transformer. Therefore, the second control module may also be referred to as a low voltage control module.

It should also be noted that, because an input voltage of the power unit may be a medium voltage (an alternating current), and an output voltage of the power unit may be a low voltage (a direct current), and because input ends of the first subsidiary power supply module and a second subsidiary power supply module are coupled to the output end of the corresponding AC/DC power main circuit, the first subsidiary power supply module and the second subsidiary power supply module may be referred to as low voltage subsidiary power supply modules.

Optionally, the second transformer may be an industrial frequency transformer. The industrial frequency transformer may obtain the first voltage $V_1$ (for example, one line voltage) from the grid power supply system, adjust the first voltage $V_1$ to the eighth voltage $V_8$, and provide the eighth voltage to the first subsidiary power supply module. Power and a size of the industrial frequency transformer are both small, and costs are low. Therefore, reliability of the power unit can be improved.

The second transformer may be a transformer of another type in addition to an industrial frequency transformer. This is not limited in this embodiment.

Power is reliably supplied to the second control module by using the second transformer and the first subsidiary power supply module, and further, reliable driving of the switching transistor in the AC/DC power main circuit is implemented. Therefore, reliability of the power unit is improved.

In a possible implementation, the power unit may further include a fan configured to dissipate heat for the power unit, and the second subsidiary power supply circuit may further include at least one second subsidiary power supply module.

Optionally, an input end of each of the at least one second subsidiary power supply module may be coupled to the output end of the AC/DC power main circuit, and an output end of each second subsidiary power supply module may be coupled to the fan.

Based on the foregoing coupling relationship, each second subsidiary power supply module may be configured to adjust the fifth voltage $V_5$ to a ninth voltage (which may be represented by $V_9$) and output the ninth voltage to the fan (that is, supply power to the fan). The ninth voltage $V_9$ may be used to indicate a voltage required by the fan.

It may be understood that, while supplying power to the second control module, the second subsidiary power supply circuit can supply power to the fan, so that the fan can stably dissipate heat for the power unit.

It may also be understood that power required by the second control module is lower than that required by the fan. Therefore, power of the first subsidiary power supply module supplying power to the second control module is relatively low, and power of the second subsidiary power supply module supplying power to the fan is relatively high, that is, the power of the second subsidiary power supply module is higher than the power of the first subsidiary power supply module.

For example, output power of the second transformer may be higher than output power of the first subsidiary power supply module, and the output power of the first subsidiary power supply module is lower than output power of each second subsidiary power supply module. For example, the output power of the first subsidiary power supply module may be 200 W, the output power of the second transformer may be 500 W, and the output power of the second subsidiary power supply module may be 500 W or 600 W.

In this embodiment, the first subsidiary power supply module with relatively low power supplies power to the second control module (with relatively low power) of the power unit, and the second subsidiary power supply module with relatively low power supplies power to the fan (with relatively high power). In other words, a power supply requirement of the high-power fan and a power supply requirement of the low-power second control module are separately implemented by two types of modules: the second subsidiary power supply module and the first subsidiary power supply module.

Because an output voltage of the solid-state transformer has a plurality of voltage values, such as 400 V and 800 V, the second subsidiary power supply circuit can match an input voltage of the second subsidiary power supply circuit with the output voltage of the solid-state transformer by using a plurality of (for example, two) second subsidiary power supply modules. The second subsidiary power supply circuit can supply subsidiary power to the power unit reliably based on different output voltages of the solid-state transformer (that is, the second subsidiary power supply circuit can supply power to the second control module based on different output voltages of the power unit). This further improves stability of the solid-state transformer. In addition, the at least one second subsidiary power supply module in the second subsidiary power supply circuit can adjust the output voltage of the AC/DC power main circuit to a voltage required by the fan, that is, supply power to the fan, so that the fan can stably dissipate heat for the power unit.

In an example, an input voltage of the first subsidiary power supply module may be 114 V to 840 V. An input voltage of the second subsidiary power supply module may be 400 V.

In another example, when the second subsidiary power supply circuit includes one first subsidiary power supply module and two second subsidiary power supply modules, it is not only possible to achieve a 400 V input voltage of the second subsidiary power supply circuit by using the two second subsidiary power supply modules, but also possible to achieve an 800 V input voltage of the second subsidiary power supply circuit by using the two second subsidiary power supply modules.

It may be understood that, an input (for example, an 800 V wide-range voltage including 400 V input voltages of the two second subsidiary power supply modules) and an output (for example, an output voltage of the first subsidiary power supply module (that is, the direct current voltage required by the second control module) of the second subsidiary power supply circuit and an output voltage (that is, the voltage required by the fan) of the second subsidiary power supply module) are split into a wide voltage input range (that is, the 800 V voltage) and a low power requirement (corresponding to the second control module with relatively low power) and a narrow voltage input range (that is, the 400 V voltage) and a high power requirement (corresponding to the fan with relatively high power), and the second subsidiary power supply circuit can supply power to the second control module and the fan at the same time. No other power supply or isolation device needs to be disposed. This not only reduces a size and costs of the second subsidiary power supply circuit, but also improves reliability of the second subsidiary power supply circuit. In addition, as long as the second subsidiary power supply circuit is connected to the grid power supply system, power can be supplied to the second control module by using the second transformer and the first subsidiary power supply module. Therefore, the scope of the second subsidiary power supply circuit is expanded.

In a possible implementation, each of the at least one second subsidiary power supply module may include a power factor correction module and a resonant module.

Optionally, an input end of the power factor correction module is coupled to the output end of the AC/DC power main circuit, an output end of the power factor correction module may be coupled to an input end of the resonant module, and an output end of the resonant module may be coupled to the fan.

Based on the foregoing coupling relationship, the power factor correction module may be configured to adjust the fifth voltage $V_5$ to a tenth voltage (which may be represented by $V_{10}$). The tenth voltage $V_{10}$ is used to indicate a voltage required by the resonant module.

Further, the resonant module may be configured to convert the tenth voltage $V_{10}$ into the ninth voltage $V_9$ and output the ninth voltage to the fan.

In a possible implementation, the first subsidiary power supply module may include a second rectifier module, a backflow prevention module, a second voltage conversion module, and a third rectifier module.

Optionally, an input end of the backflow prevention module may be coupled to the output end of the AC/DC power main circuit, an output end of the backflow prevention module may be coupled to an input end of the second rectifier module, the input end of the second rectifier module may be further coupled to the output end of the second transformer, an output end of the second rectifier module may be coupled to an input end of the second voltage conversion module, an output end of the second voltage conversion module may be coupled to an input end of the third rectifier module, and an output end of the third rectifier module may be coupled to the second control module (herein, it may be considered that the output end of the third rectifier module is coupled to the second detection circuit in the second control module).

Based on the foregoing coupling relationship, the second rectifier module may be configured to convert the fifth voltage $V_5$ and the eighth voltage $V_8$ into an eleventh voltage (which may be represented by $V_{11}$) and output the eleventh voltage to the second voltage conversion module. The eleventh voltage $V_{11}$ may be used to indicate a direct current voltage output by the second rectifier module.

Further, the backflow prevention module may be configured to prevent the eleventh voltage $V_{11}$ from backflowing to the AC/DC power main circuit.

Further, the second voltage conversion module may be configured to process the eleventh voltage $V_{11}$ into a twelfth voltage (which may be represented by $V_{12}$) and output the twelfth voltage to the third rectifier module. The twelfth voltage $V_{12}$ may be used to indicate an alternating current voltage output by the second voltage conversion module.

Further, the third rectifier module may be configured to convert the twelfth voltage $V_{12}$ into the seventh voltage $V_7$ and output the seventh voltage to the second control module.

In a possible implementation, the backflow prevention module may include a first switching transistor (for implementing a backflow prevention function).

For example, the first switching transistor may be a diode, a triode, or a field effect transistor (which may be a junction field effect transistor or an insulated gate field effect transistor).

For example, when the first switching transistor is a diode, an anode of the diode may be coupled to the output end of the AC/DC power main circuit, and a cathode of the diode may be coupled to the input end of the second rectifier module.

For another example, when the first switching transistor is a triode, a collector of the triode may be coupled to the output end of the AC/DC power main circuit, and an emitter of the triode may be coupled to the input end of the second rectifier module.

For another example, when the first switching transistor is a field effect transistor, a source of the field effect transistor may be coupled to the output end of the AC/DC power main circuit, and a drain of the field effect transistor may be coupled to the input end of the second rectifier module.

In a possible implementation, the first subsidiary power supply module and a first subsidiary power supply module (a low voltage subsidiary power supply module) of a subsidiary power supply system in another solid-state transformer may be mutually redundant (which may also be referred to as mutual backup). When a transformation system includes only a single solid-state transformer (the solid-state transformer may include two second subsidiary power supply modules), a failure of either of the second subsidiary power supply modules does not cause shutdown of the second subsidiary power supply circuit, and the failed second subsidiary power supply module can be quickly replaced. Therefore, stability of the second subsidiary power supply circuit is improved, and further, reliable operation of the solid-state transformer is implemented. When the transformation system includes more than two solid-state transformers, replacement of any second subsidiary power supply circuit does not cause shutdown of the transformation system. In addition, the first subsidiary power supply module and the second subsidiary power supply module in the second subsidiary power supply circuit are respectively provided with a hot swap interface, and hot swap is supported. The second subsidiary power supply circuit can effectively improve stability and a maintenance speed of the transformation system.

It should be understood that the solution in the second aspect is consistent with the solution in the first aspect. Beneficial effects achieved in the aspects and the corresponding feasible implementations are similar, and details are not described again.

DETAILED DESCRIPTION OF EMBODIMENTS

Figure 1:
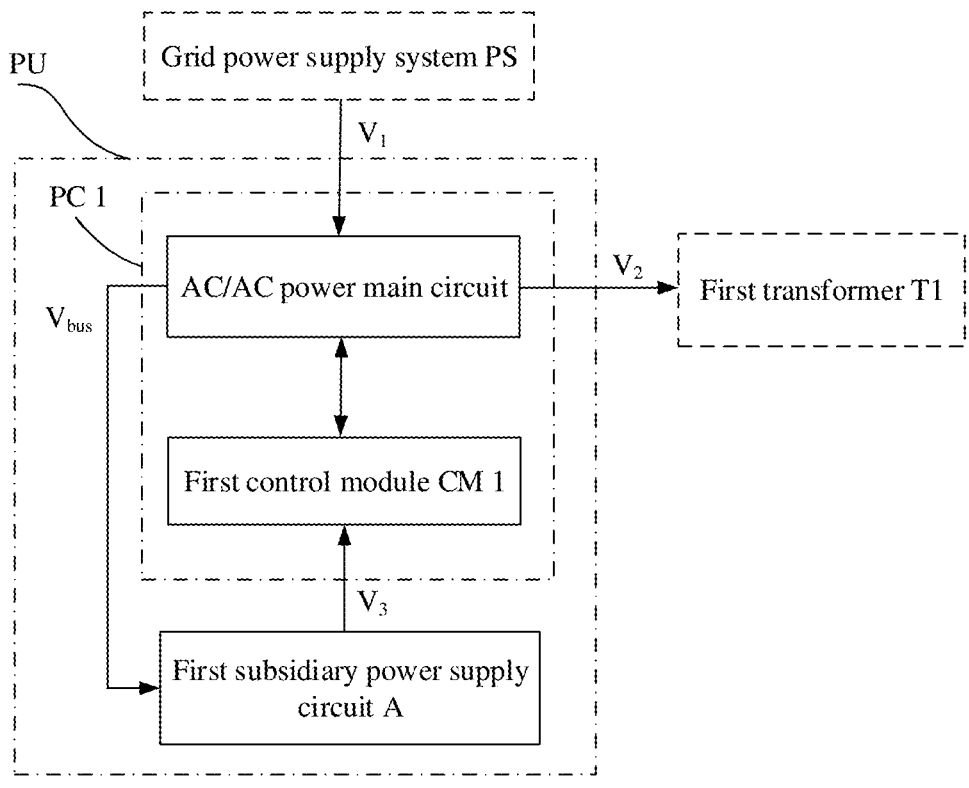
FIG. 1 is a schematic diagram of a structure of a power unit (PU) according to an embodiment.

The following describes the embodiments with reference to the accompanying drawings.

To make the objectives, solutions, and advantages of the embodiments clearer, the following clearly and completely describes the embodiments with reference to the accompanying drawings. It is clear that the described embodiments are some but not all of the embodiments. All other embodiments obtained by a person of ordinary skill in the art based on the embodiments without creative efforts shall fall within the scope of the embodiments.

In the embodiments and the accompanying drawings, the terms "first", "second" and the like are only used for distinction and description and cannot be understood as indicating or implying relative importance or a sequence. Moreover, the terms "include", "have", and any other variant thereof are intended to cover a non-exclusive inclusion, for example, including a series of steps or units. Methods, systems, products, or devices are not necessarily limited to those explicitly listed steps or units but may include other steps or units that are not explicitly listed or that are inherent to such processes, methods, products, or devices.

It should be understood that "at least one (item)" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" can indicate an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent: a, b, c, "a and b", "a and c", "b and c", or "a, b, and c", where a, b, and c may be singular or plural.

With development of a power system, a power transformer becomes one of main devices in the power system such as a power plant and a substation. The power transformer can not only step up a voltage to transmit power to an electricity utilization area, but also step down the voltage to service voltages at various levels to meet requirements for electricity utilization. In short, both the voltage step-up and voltage step-down can be accomplished by the power transformer. In a process of power transmission of the power system, a voltage loss and a power loss inevitably occur. When the same power is transmitted, the voltage loss is inversely proportional to the voltage, and the power loss is inversely proportional to a square of the voltage. By using the power transformer, not only the voltage can be stepped up, but also the power loss can be reduced.

Power transformers include conventional transformers, solid-state transformers (SSTs), and the like. A conventional transformer includes two or more coil windings around a same iron core, where the windings are connected by an alternating magnetic field and work according to a principle of electromagnetic induction. When the conventional transformer operates at no load, relatively high reactive power is required. The reactive power needs to be supplied by a power supply system. A rated capacity of the conventional transformer should be selected based on a requirement of an electrical load and should not be excessively high or excessively low. A solid-state transformer (SST) is a stationary electrical device for converting power of one power characteristic into power of another power characteristic (for example, implementing voltage conversion and power transfer) by using a combination of a power electronics conversion technology and a high-frequency power conversion technology that is based on the principle of electromagnetic induction.

Because the conventional transformer works reliably and has a simple structure, the conventional transformer has become an important part of the grid power supply system and is widely applied in the grid power supply system. A main function of the conventional transformer is to implement voltage level conversion and electrical isolation. However, the conventional transformer is large in size, cannot maintain stability of an output voltage, and has no capability of improving power quality. Compared with the conventional power transformer, the SST is smaller in size, can maintain stability of an output voltage, and can improve an input power factor and a current harmonics indicator. After the SST is applied to the power system, power quality of the power system and stability of the power system can be improved, and a flexible power transmission mode and real-time power flow control in a power market can be implemented. Therefore, the SST has become one of main research objects in the power system.

Because a power unit in the SST includes a control module configured to implement functions such as control and driving of power components in the power unit, how to supply power to the control module becomes an urgent problem to be resolved.

To resolve the foregoing problem, an embodiment provides a power unit, as shown in FIG. 1. Referring to FIG. 1, the power unit (PU) may include a first subsidiary power supply circuit A and a first power circuit (PC) 1. The first power circuit PC 1 may include an AC/AC power main circuit and a first control module (CM) 1 coupled to the AC/AC power main circuit.

As can be understood from FIG. 1, an input end of the first subsidiary power supply circuit A is coupled to the AC/AC power main circuit (which may be a bus of the AC/AC power main circuit, not shown in FIG. 1), an output end of the first subsidiary power supply circuit A is coupled to the first control module CM 1, the AC/AC power main circuit includes an input end and an output end, the input end of the AC/AC power main circuit may be coupled to a grid power supply system (PS), which may be a power distribution system or a power transmission system), and the output end of the AC/AC power main circuit may be coupled to a transformer (that is, a first transformer (T) r 1) in the PU.

In a technology of the coupling relationship shown in FIG. 1, the AC/AC power main circuit may be configured to adjust a first voltage $V_1$ from the grid power supply system PS to a second voltage $V_2$ and output the second voltage (which may be output to the first transformer T1) through the output end of the AC/AC power main circuit.

Further, the first control module CM 1 may be configured to detect at least one of a status of the AC/AC power main circuit or information of the AC/AC power main circuit, and drive the AC/AC power main circuit based on at least one of the status or information of the AC/AC power main circuit (may drive a switching transistor in the AC/AC power main circuit).

Further, the first subsidiary power supply circuit A may be configured to adjust a voltage $V_{bus}$ of the bus of the AC/AC power main circuit to a third voltage $V_3$ and output the third voltage to the first control module CM 1 (that is, the first subsidiary power supply circuit A supplies power to the first control module CM 1). The third voltage $V_3$ may be used to indicate a direct current voltage required by the first control module CM 1.

It should be noted that the status of the AC/AC power main circuit may be a status (including ON and OFF) of the switching transistor (such as a triode or an IGBT) in the AC/AC power main circuit. The information of the AC/AC power main circuit may include at least one of an input voltage, an input current, an output voltage, or an output current of the AC/AC power main circuit.

Because the first voltage $V_1$ can be an alternating current voltage, that is, an input of the first power circuit PC 1 can be an alternating current, and an output of the first power circuit PC 1 is also an alternating current, the first power circuit PC 1 may be referred to as an alternating current conversion circuit. In addition, because the input of the first power circuit PC 1 can be a high voltage or a medium voltage, the first power circuit PC 1 may also be referred to as a high voltage power circuit or a medium voltage power circuit.

The PU provided in this embodiment can reliably supply power to the first control module CM 1 in the first power circuit PC 1 by using the first subsidiary power supply circuit A, thereby improving operation reliability of the first control module CM 1. In addition, because no isolation device needs to be disposed separately, power supply costs of the first control module CM 1 are reduced, and a size of the PU is reduced.

Figure 2:
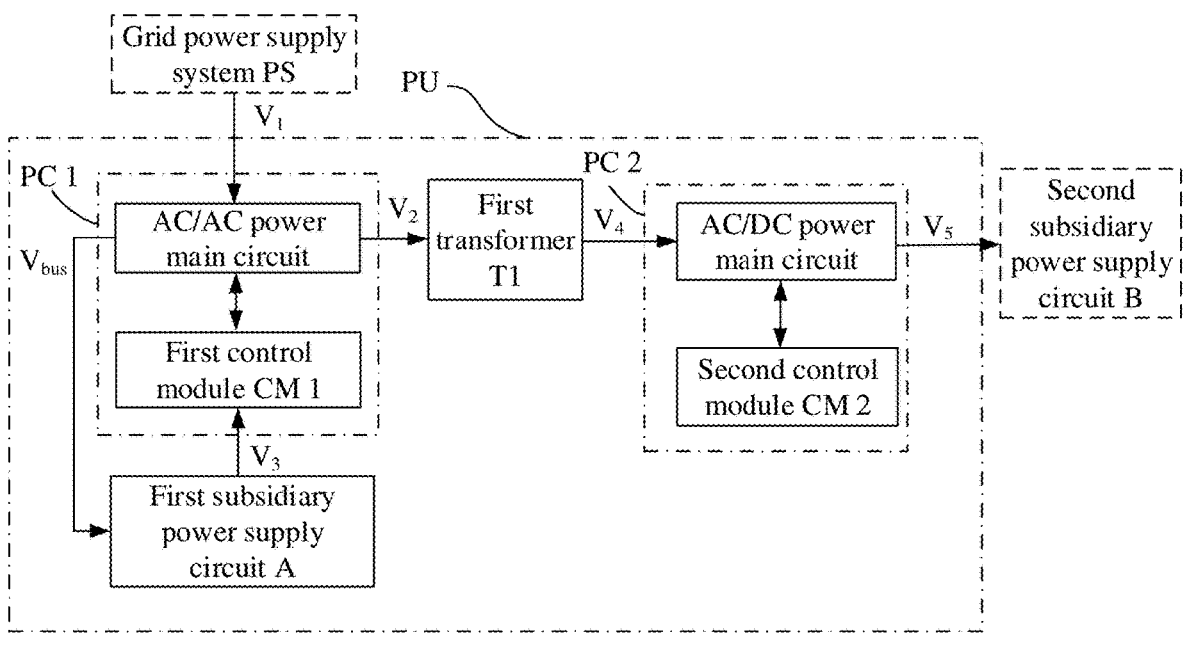
FIG. 2 is a schematic diagram of a structure of another PU according to an embodiment.

Based on FIG. 1, this embodiment provides a PU shown in FIG. 2. Referring to FIG. 2, the PU may further include a first transformer T1 and a second power circuit PC 2, the second power circuit PC 2 may include an alternating current AC/DC power main circuit and a second control module CM 2 coupled to the AC/DC power main circuit, and the AC/DC power main circuit may include an input end and an output end.

Optionally, an input end of the first transformer T1 is coupled to the output end of the AC/AC power main circuit, and an output end of the first transformer T1 is coupled to the input end of the AC/DC power main circuit.

Based on the coupling relationship shown in FIG. 2, the first transformer T1 may be configured to adjust the second voltage $V_2$ to a fourth voltage $V_4$ and output the fourth voltage to the AC/DC power main circuit. The fourth voltage $V_4$ may be used to indicate an alternating current voltage required by the AC/DC power main circuit.

Further, the AC/DC power main circuit is configured to rectify the fourth voltage $V_4$ into a fifth voltage $V_5$ and output the fifth voltage (which may be output to a second subsidiary power supply circuit B) through the output end of the AC/DC power main circuit. The fifth voltage $V_5$ may be used to indicate a direct current voltage output by the AC/DC power main circuit.

Further, the second control module CM 2 may be configured to detect at least one of a status or information of the AC/DC power main circuit and drive the AC/DC power main circuit based on at least one of the status or information of the AC/DC power main circuit.

Optionally, the first transformer T1 may be a high frequency transformer or may be a transformer of another type. This is not limited in this embodiment.

For example, the status of the AC/DC power main circuit may be a status (including ON and OFF) of a switching transistor (such as a triode or an IGBT) in the AC/DC power main circuit. The information of the AC/DC power main circuit may include at least one of an input voltage, an input current, an output voltage, or an output current of the AC/DC power main circuit.

It should be noted that a voltage value (which may also be referred to as a voltage level) of the first power circuit PC 1 may be higher than a voltage value of the second power circuit PC 2. Because an input of the first power circuit PC 1 may be an alternating current from the grid power supply system PS, and an output of the first power circuit PC 1 is also an alternating current, the first power circuit PC 1 may be referred to as an alternating current conversion circuit. In addition, the input of the first power circuit PC 1 may be a high voltage (for example, a voltage above 35 kV and below 220 kV) or a medium voltage (for example, a voltage above 1 kV and is 35 kV or below 35 kV). Therefore, the first power circuit PC 1 may also be referred to as a high voltage power circuit or a medium voltage power circuit.

It should also be noted that because an output end (that is, the output end of the AC/AC power main circuit in the first power circuit PC 1) of the first power circuit PC 1 is coupled to the input end (that is, a primary side coil of the first transformer T1) of the first transformer T1, and the output end (that is, a secondary side coil of the first transformer T1) of the first transformer T1 is coupled to an input end (that is, the input end of the AC/DC power main circuit in the second power circuit PC 2) of the second power circuit PC 2, it can be determined that the first transformer T1 converts a high voltage or a medium voltage from the first power circuit PC 1 into a low voltage (for example, a voltage below 1 kV, also an alternating current voltage). Further, the second power circuit PC 2 converts the low voltage obtained through conversion by the first transformer T1 into a direct current voltage (the direct current voltage is also a low voltage). Therefore, the second power circuit PC 2 may be referred to as a low voltage power circuit.

In this embodiment, conversion and transmission from the input to the output of the PU are implemented by using the AC/AC power main circuit, the first transformer T1, and the AC/DC power main circuit. In addition, reliable driving of the switching transistor in the AC/AC power main circuit is implemented by using the first control module CM 1, and reliable driving of the switching transistor in the AC/DC power main circuit is implemented by using the second control module CM 2. Therefore, reliability of the AC/DC power main circuit and the AC/AC power main circuit is improved.

Figure 3:
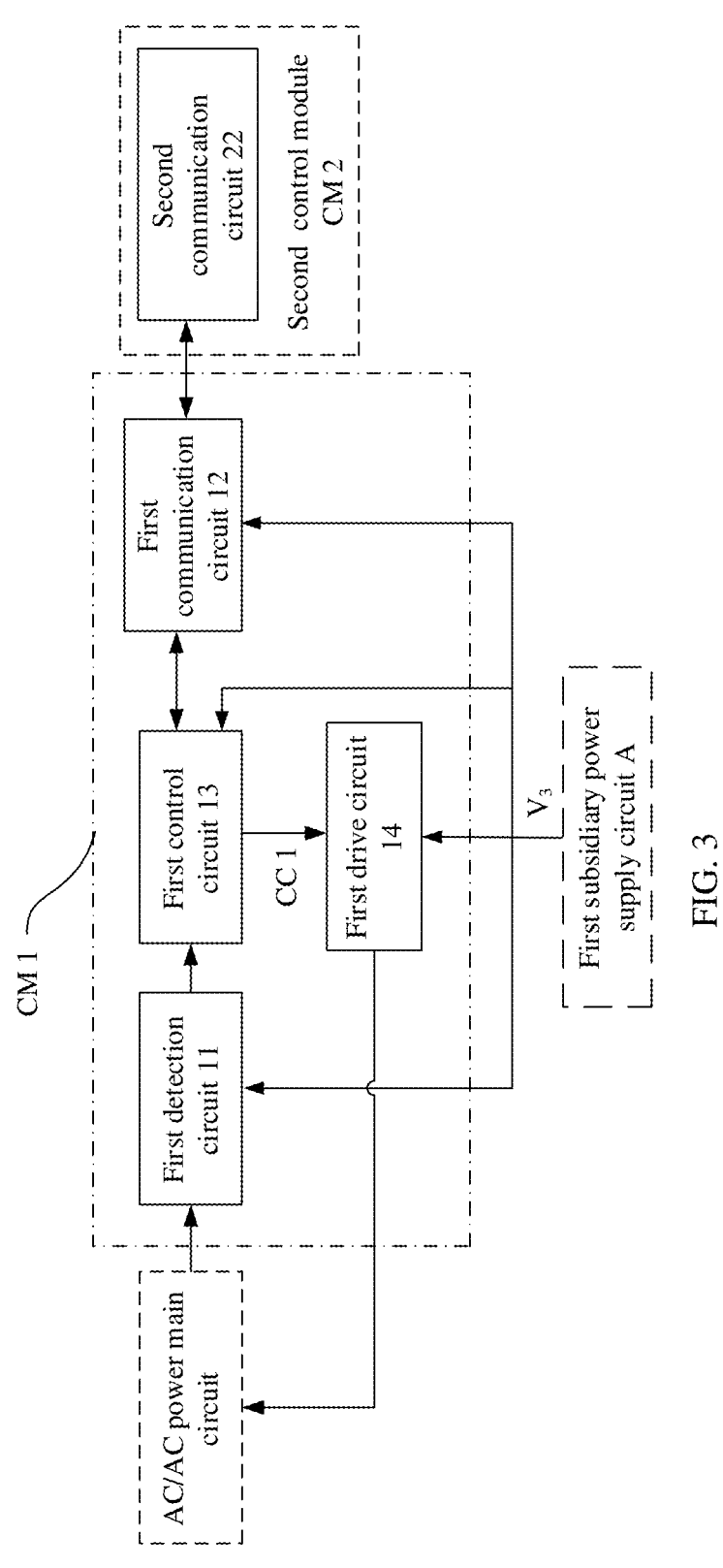
FIG. 3 is a schematic diagram of a structure of a first control module CM 1 according to an embodiment.

In an example, the first control module CM 1 in FIG. 2 may be further shown in FIG. 3. Referring to FIG. 3, the first control module CM 1 may include a first detection circuit 11, a first communication circuit 12, a first control circuit 13, and a first drive circuit 14.

Optionally, an input end of the first detection circuit 11 may be coupled to the AC/AC power main circuit, an output end of the first detection circuit 11 may be coupled to an input end of the first control circuit 13, an output end of the first control circuit 13 may be coupled to an input end of the first drive circuit 14, an output end of the first drive circuit 14 may be coupled to the AC/AC power main circuit, the first control circuit 13 may be further coupled to the first communication circuit 12, and the first communication circuit 12 is coupled to the second control module CM 2 (which may be a second communication circuit 22 of the second control module CM 2).

Based on the coupling relationship shown in FIG. 3, it may be further determined that:

the first detection circuit 11 may be configured to detect at least one of the status or information of the AC/AC power main circuit.

Further, the status of the AC/DC power main circuit may include the status of the power switching transistor in the AC/DC power main circuit (including an ON state and an OFF state), and the information of the AC/DC power main circuit may include a current and a voltage of the AC/DC power main circuit.

For example, a current transformer may be used to capture a current (an input current and an output current) of the AC/DC power main circuit, and a resistor voltage divider circuit may be used to capture a voltage (an input voltage and an output voltage) of the AC/DC power main circuit.

The first control circuit 13 may be configured to transmit at least one of the status or information of the AC/AC power main circuit to the first communication circuit 12.

The first communication circuit 12 may be configured to transmit at least one of the status or information of the AC/AC power main circuit to the second control module CM 2 (which may be the second communication circuit 22 of the second control module CM 2), and transmit at least one of the status or information of the AC/DC power main circuit from the second control module CM 2 (which may be the second communication circuit 22 of the second control module CM 2) to the first control circuit 13.

It should be noted that because the first power circuit PC 1 includes the first control module CM 1 and the AC/AC power main circuit (refer to the foregoing description), and the second power circuit PC 2 includes the second control module CM 2 and the AC/DC power main circuit (refer to the following description), the first communication circuit 12 may transmit at least one of the status or information of the AC/AC power main circuit to the second control module CM 2 (that is, the second communication circuit 22 of the second control module CM 2), and the second communication circuit 22 may transmit at least one of the status or information of the AC/DC power main circuit to the first control module CM 1 (which may be the first communication circuit 12 of the first control module CM 1).

After the first communication circuit 12 transmits at least one of the status or information of the AC/AC power main circuit or at least one of the status or information of the AC/DC power main circuit from the second communication circuit 22 (that is, at least one of the status of the AC/DC power main circuit, the information of the AC/DC power main circuit, the status of the AC/AC power main circuit, and the information of the AC/AC power main circuit) to the first control circuit 13, the first control circuit 13 may be further configured to perform a proportional-integral-derivative (proportional-integral-derivative, PID) operation on at least one of the status or information of the AC/DC power main circuit or at least one of the status or information of the AC/AC power main circuit to obtain a first control command CC (control command) 1, and send the first control command CC 1 to the first drive circuit 14.

The first control command CC 1 may be a pulse width modulation (pulse width modulation, that is, a PWM wave). The PWM wave may include a frequency of the PWM wave and a duty cycle of the PWM wave.

Optionally, the first control circuit 13 may determine the status of the switching transistor in the AC/AC power main circuit by detecting at least one of the current or the voltage of the AC/AC power main circuit by using the first detection circuit 11.

For example, if the current of the AC/AC power main circuit shows a rising trend, the first control circuit 13 may determine that the status of the power switching transistor in the AC/AC power main circuit is the ON state. Conversely, if the current of the AC/AC power main circuit shows a falling trend, the first control circuit 13 may determine that the status of the power switching transistor in the AC/AC power main circuit is the OFF state.

Further, the first drive circuit 14 may be configured to drive the AC/AC power main circuit based on the first control command CC 1.

Optionally, the first drive circuit 14 may control a switching time (or an ON time and an OFF time) of the power switching transistor based on the frequency of the PWM wave and the duty ratio of the PWM wave, to implement reliable driving of the AC/AC power main circuit and implement voltage and current regulation of the AC/AC power main circuit.

In this embodiment, the first control module CM 1 can not only drive the switching transistor in the AC/AC power main circuit by using at least one of the status or information of the AC/DC power main circuit or at least one of the status or information of the AC/AC power main circuit, but also transmit at least one of the status or information of the AC/AC power main circuit to the second control module CM 2, to provide a basis for the second control module CM 2 to implement reliable driving of the switching transistor in the AC/DC power main circuit.

Figure 4:
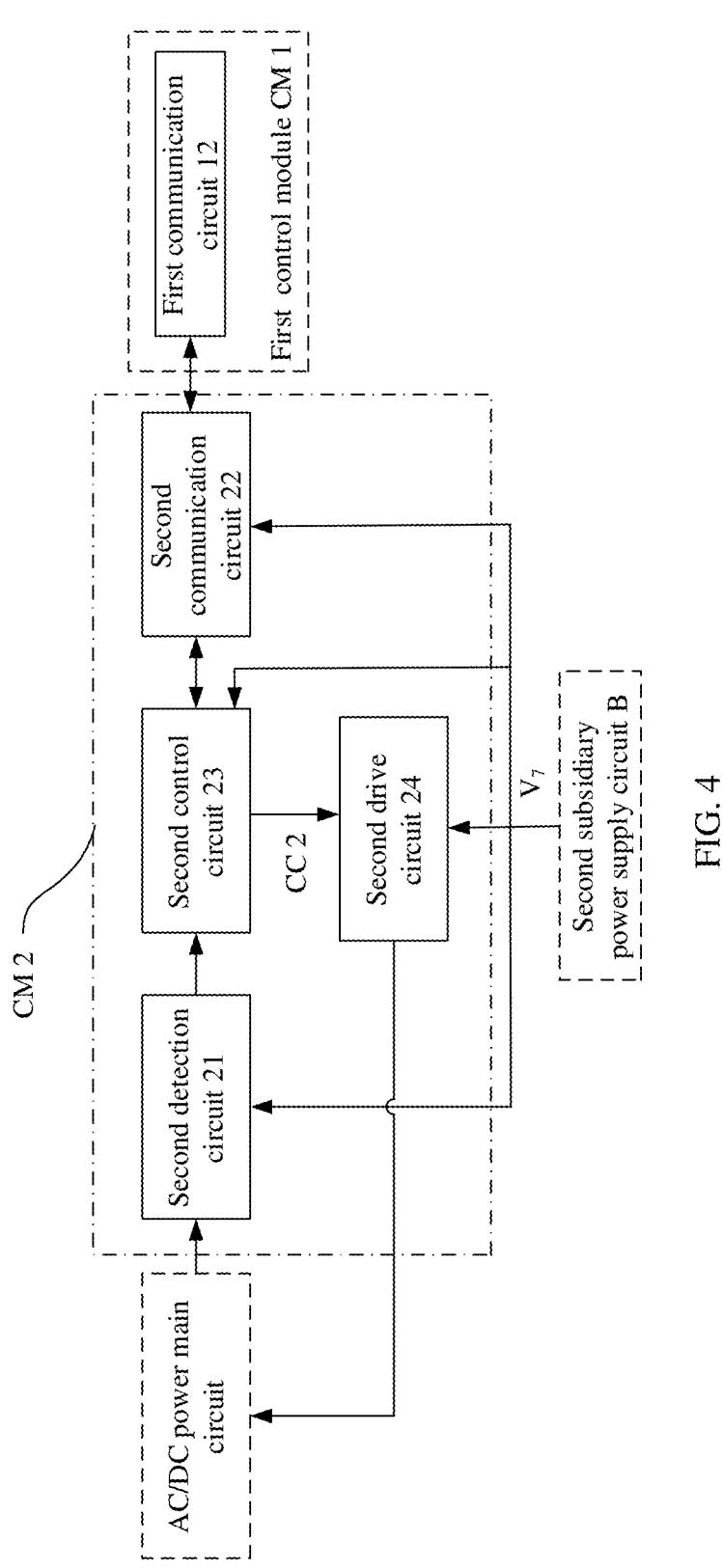
FIG. 4 is a schematic diagram of a structure of a second control module CM 2 according to an embodiment.

In another example, the second control module CM 2 in FIG. 2 may be further shown in FIG. 4. Referring to FIG. 4, the second control module CM 2 may include a second detection circuit 21, a second communication circuit 22, a second control circuit 23, and a second drive circuit 24.

Optionally, an input end of the second detection circuit 21 may be coupled to the AC/DC power main circuit, an output end of the second detection circuit 21 may be coupled to an input end of the second control circuit 23, an output end of the second control circuit 23 may be coupled to an input end of the second drive circuit 24, an output end of the second drive circuit 24 may be coupled to the AC/DC power main circuit, the second control circuit 23 is further coupled to the second communication circuit 22, and the second communication circuit 22 is coupled to the first communication circuit 11 of the first control module CM 1.

Based on the coupling relationship shown in FIG. 4, it may be further determined that:

the second detection circuit 21 may be configured to detect at least one of the status or information of the AC/DC power main circuit.

Further, the status of the AC/DC power main circuit may include the status of the power switching transistor in the AC/DC power main circuit (including an ON state and an OFF state), and the information of the AC/DC power main circuit may include a current and a voltage of the AC/DC power main circuit.

For example, a current transformer may be used to capture a current (an input current and an output current) of the AC/DC power main circuit, and a resistor voltage divider circuit may be used to capture a voltage (an input voltage and an output voltage) of the AC/DC power main circuit.

The second control circuit 23 may be configured to transmit at least one of the status or information of the AC/DC power main circuit to the second communication circuit SC 22.

The second communication circuit 22 may be configured to transmit at least one of the status or information of the AC/DC power main circuit to the first communication circuit 12 and transmit at least one of the status or information of the AC/AC power main circuit from the first communication circuit 12 to the second control circuit 23.

After the second communication circuit 22 transmits at least one of the status or information of the AC/DC power main circuit or at least one of the status or information of the AC/AC power main circuit from the first communication circuit 12 (that is, at least one of the status of the AC/DC power main circuit, the information of the AC/DC power main circuit, the status of the AC/AC power main circuit, and the information of the AC/AC power main circuit) to the second control circuit 23, the second control circuit 23 may be further configured to perform a PID operation on at least one of the status or information of the AC/DC power main circuit or at least one of the status or information of the AC/AC power main circuit from the first communication circuit 12, to obtain a second control command CC 2, and send the second control command CC 2 to the second drive circuit 24.

Similar to the first control command CC 1, the second control command CC 2 may also be a PWM wave. The PWM wave may include a frequency of the PWM wave and a duty cycle of the PWM wave.

Optionally, the second control circuit 23 may determine the status of the switching transistor in the AC/DC power main circuit by detecting at least one of the current or the voltage of the AC/DC power main circuit by using the second detection circuit 21.

For example, if the current of the AC/DC power main circuit shows a rising trend, the second control circuit 23 may determine that the status of the power switching transistor in the AC/DC power main circuit is the ON state. Conversely, if the current of the AC/DC power main circuit shows a falling trend, the second control circuit 23 may determine that the status of the power switching transistor in the AC/DC power main circuit is the OFF state.

Further, the second drive circuit 24 may be configured to drive the AC/DC power main circuit based on the second control command CC 2.

Optionally, the second drive circuit 24 may control a switching time (or an ON time and an OFF time) of the power switching transistor based on the frequency of the PWM wave and the duty ratio of the PWM wave, to implement reliable driving of the AC/DC power main circuit and implement voltage and current regulation of the AC/DC power main circuit.

The second control module CM 2 can not only drive the switching transistor in the AC/AC power main circuit by using at least one of the status or information of the AC/DC power main circuit or at least one of the status or information of the AC/AC power main circuit, but also transmit at least one of the status or information of the AC/DC power main circuit to the first control module CM 1, to provide a basis for the first control module CM 1 to implement reliable driving of the switching transistor in the AC/AC power main circuit.

It may be understood from FIG. 3 and FIG. 4 and the foregoing description that the first communication circuit 11 is coupled not only to the first control circuit 13, but also to the second communication circuit 22. Moreover, the second communication circuit 22 is coupled not only to the second control circuit 23, but also to the first communication circuit 11. Therefore, communication between the first control module CM 1 and the second control module CM 2 can be implemented by using the first communication circuit 11 and the second communication circuit 22. In other words, at least one of the status or information of the AC/AC power main circuit in the first power circuit PC 1 and at least one of the status or information of the AC/DC power main circuit in the second power circuit PC 2 can be transmitted between the first power circuit PC 1 and the second power circuit PC 2 by using the first communication circuit 11 and the second communication circuit 22.

In addition, the first control circuit 13 needs to deliver the first control command CC 1 to the first drive circuit 14 not only based on at least one of the status or information of the AC/AC power main circuit that is detected by the first detection circuit 11, but also based on at least one of the status or information of the AC/DC power main circuit that is detected by the second detection circuit 21.

Similar to the first control circuit 13, the second control circuit 23 needs to deliver the second control command CC 2 to the second drive circuit 24 not only based on at least one of the status or information of the AC/DC power main circuit that is detected by the second detection circuit 21, but also based on at least one of the status or information of the AC/AC power main circuit that is detected by the first detection circuit 11.

In other words, the first power circuit PC 1 needs to control an action of the switching transistor in the AC/AC power main circuit in the first power circuit PC 1 based on the status of the switching transistor in the AC/AC power main circuit in the first power circuit PC 1 and the information (at least one of voltage or current) of the AC/AC power main circuit, and the status of the switching transistor in the AC/DC power main circuit in the second power circuit PC 2 and the information (at least one of voltage or current) of the AC/DC power main circuit. Similar to the first power circuit PC 1, the second power circuit PC 2 needs to control an action of the switching transistor in the AC/DC power main circuit in the second power circuit PC 2 based on the status of the switching transistor in the AC/DC power main circuit in the second power circuit PC 2 and the information (at least one of voltage or current) of the AC/DC power main circuit, and the status of the switching transistor in the AC/AC power main circuit in the first power circuit PC 1 and the information (at least one of voltage or current) of the AC/AC power main circuit.

Figure 5:
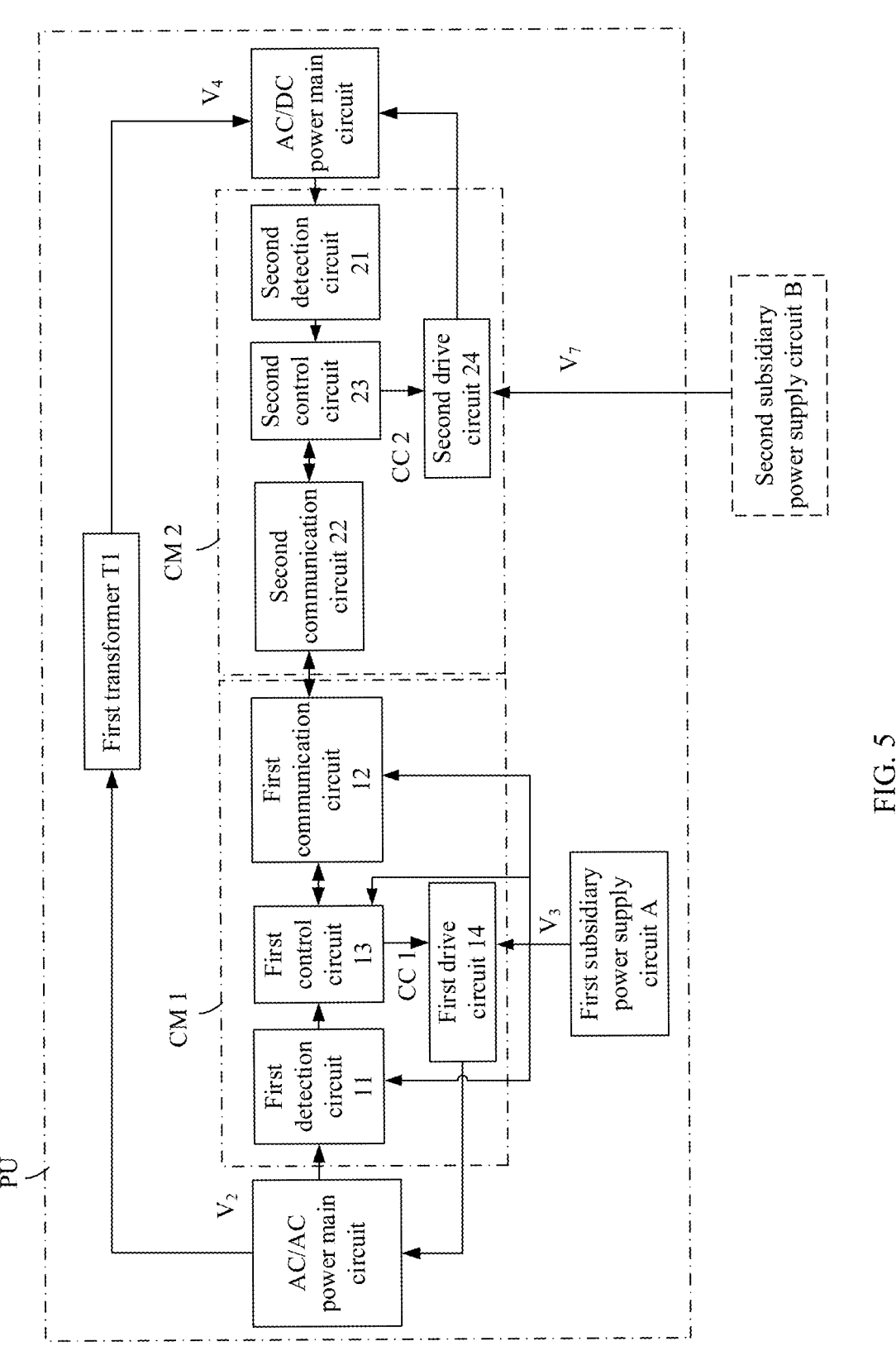
FIG. 5 is a schematic diagram of a structure of yet another PU according to an embodiment.

With reference to the foregoing FIG. 1 to FIG. 4, the PU shown in FIG. 5 may be obtained. FIG. 5 is merely an example diagram of a structure of the PU. The PU may alternatively use a structure in another form. This is not limited in this embodiment.

Figure 6:
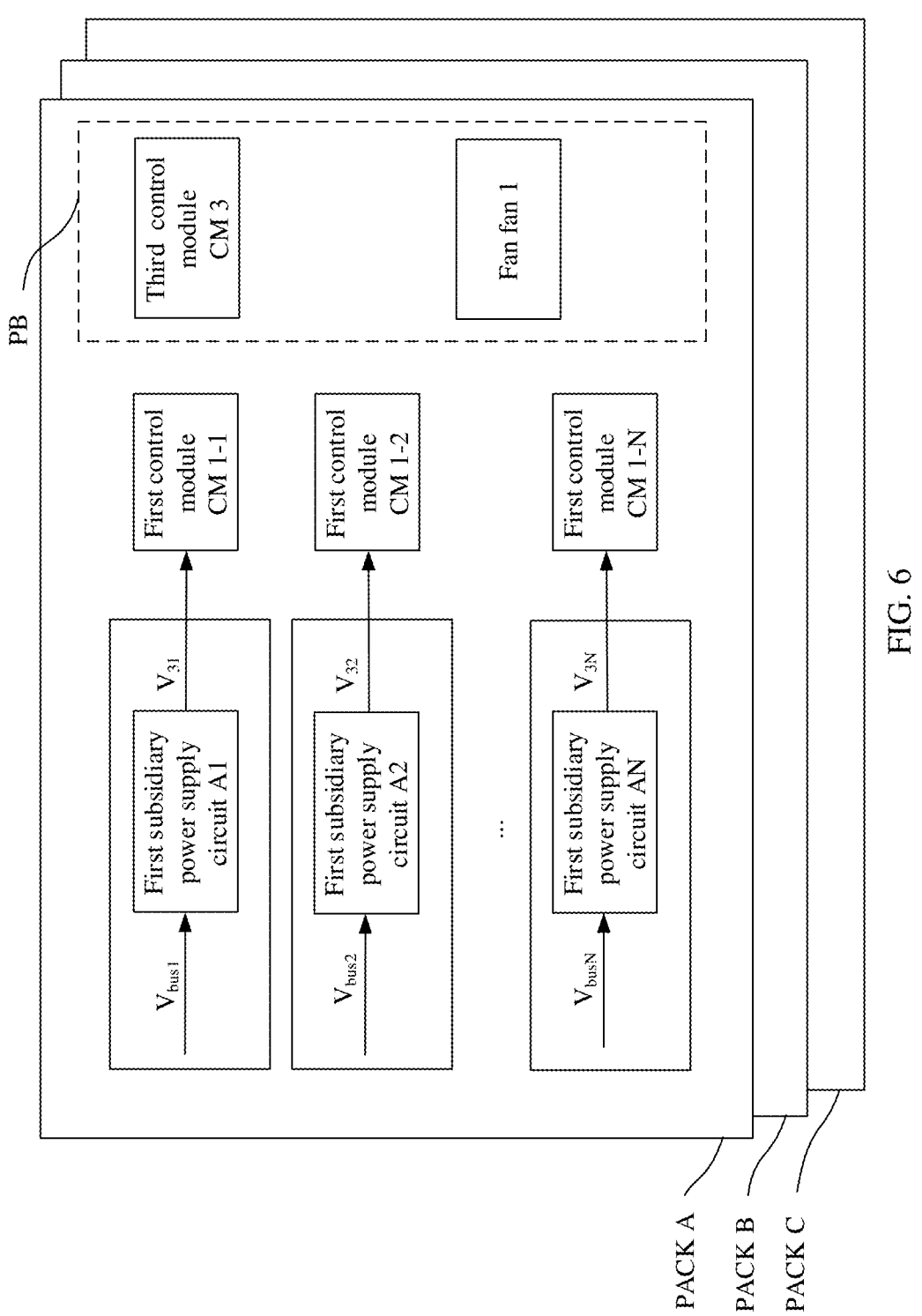
FIG. 6 is a schematic diagram of a structure of a three-phase subsidiary power supply circuit of a power unit PU according to an embodiment.

Because an input voltage of the PU can be a three-phase alternating current, in a possible implementation, referring to FIG. 6, each phase (that is, a PACK A, a PACK B, and a PACK C, using the PACK A as an example) of a three-phase subsidiary power supply circuit of the PU (that is, the PACK A, the PACK B, and the PACK C in FIG. 6) may include N first subsidiary power supply circuits A (that is, a first subsidiary power supply circuit A1 to a first subsidiary power supply circuit AN in FIG. 6) may be included. In FIG. 6, $V_{bus1}$ to $V_{busN}$ are voltages of buses of a PU 1 to a PU N respectively, and $V_{31}$ to $V_{3N}$ are output voltages of the first subsidiary power supply circuit A1 to the first subsidiary power supply circuit AN respectively.

It should be noted that N may be 1. When N is 1, it indicates that a SST includes only one PU. An input end of each of the N first subsidiary power supply circuits A is coupled to a bus of a corresponding PU (a first power circuit PCI in a PU includes one bus), and an output end of each of the N first subsidiary power supply circuits A is coupled to a first control module CM 1 of the corresponding PU (that is, a first control modules CM 1-1 to a first control modules CM 1-N in FIG. 6, N first control modules CMs 1 in total, where it should be noted that one PU includes one first control module CM 1).

For example, an input end of the first subsidiary power supply circuit A1 is coupled to a bus of the PU 1, and an output end of the first subsidiary power supply circuit A1 is coupled to a first control module CM 1-1 of the PU 1.

For another example, an input end of the first subsidiary power supply circuit A2 is coupled to a bus of the PU 2, and an output end of the first subsidiary power supply circuit A2 is coupled to a first control module CM 1-2 of the PU 2.

For another example, an input end of the first subsidiary power supply circuit AN is coupled to a bus of the PU N, and an output end of the first subsidiary power supply circuit AN is coupled to a first control module CM 1-N of the PU N.

Based on the coupling relationship in FIG. 6, it can be determined that the first subsidiary power supply circuit A1 among the N first subsidiary power supply circuits A supplies power to the first control module CM 1-1 of the PU based on the bus voltage $V_{bus1}$ from the bus 1 of the PU. In other words, the first subsidiary power supply circuit A1 adjusts the bus voltage $V_{bus1}$ to a voltage required by the first control module CM 1-1 (that is, a third voltage $V_{31}$ in FIG. 6 which may also be considered as an output voltage of the first subsidiary power supply circuit A1), and outputs the voltage to the first control module CM 1-1, to supply power to the first control module CM 1-1. Similar to the first subsidiary power supply circuit A1, the first subsidiary power supply circuits A2 to AN respectively supply power to the first control modules CM 1-2 to CM 1-N of the Pus by using bus voltages $V_{bus2}$ to $V_{busN}$ from the buses bus 2 to bus N, that is, the first subsidiary power supply circuits A2 to AN respectively adjust the bus voltages $V_{bus2}$ to $V_{busN}$ to voltages required by the first control modules CM 1-2 to CM 1-N (that is, a third voltage $V_{32}$ to a third voltage $V_{3N}$ in FIG. 6, which may also be considered as output voltages of the first subsidiary power supply circuits A2 to AN respectively), and output the voltages to the first control modules CM 1-1 to CM 1-N.

It may be understood that, because an input voltage of the PU is a medium voltage (an alternating current), and an output voltage of the PU is a low voltage (a direct current), and because the input end of the first subsidiary power supply circuit A is coupled to the bus of the corresponding PU, the first subsidiary power supply circuit A may be referred to as a medium voltage subsidiary power supply circuit. In addition, because the first subsidiary power supply circuit A adjusts the bus voltage to a voltage required by the first control module CM 1 and provides the voltage to the first control module CM 1 to supply power to the first control module CM 1, the first control module CM 1 may also be referred to as a medium voltage control module.

In addition, as shown in FIG. 6, a power board (power board, PB, which may also be referred to as a control board) is further disposed in each of the PACK A, the PACK B, and the PACK C. A third control module CM 3 (which may also be referred to as a PACK control module, configured to implement detection, control, driving, communication, and the like of power main circuits (including an AC/DC power main circuit and an AC/AC power main circuit) in each of the PACK A, the PACK B, and the PACK C) and a fan 1 (configured to dissipate heat for the AC/DC power main circuit and the AC/AC power main circuit) are disposed on the power board PB.

Figure 7:
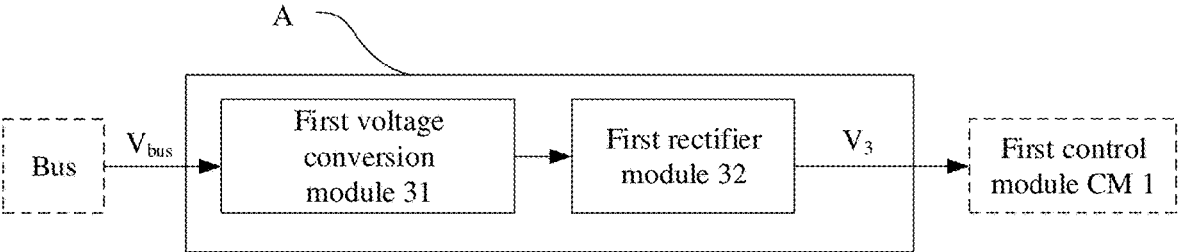
FIG. 7 is a schematic diagram of a structure of a first subsidiary power supply circuit A according to an embodiment.

Further, the first subsidiary power supply circuit A may include a first voltage conversion module 31 and a first rectifier module 32, as shown in FIG. 7. An input end of the first voltage conversion module 31 is coupled to the bus (bus in FIG. 7) of the PU, an output end of the first voltage conversion module 31 is coupled to an input end of the first rectifier module 32, and an output end of the first rectifier module 31 is coupled to the first control module CM 1.

Based on the foregoing coupling relationship, it may be further determined that the first voltage conversion module 31 converts the bus voltage (alternating current voltage, that is, $V_{bus}$ in FIG. 7, which may be any one of $V_{bus1}$ to $V_{busN}$) from the bus, to obtain a converted voltage. The first rectifier module 32 rectifies the converted voltage from the first voltage conversion module 31 to obtain the direct current voltage required by the first control module CM 1 (that is, $V_3$ in FIG. 7, which may also be considered as the output voltage of the first subsidiary power supply circuit A) and provides the third voltage $V_3$ to the first control module CM 1.

Figure 8:
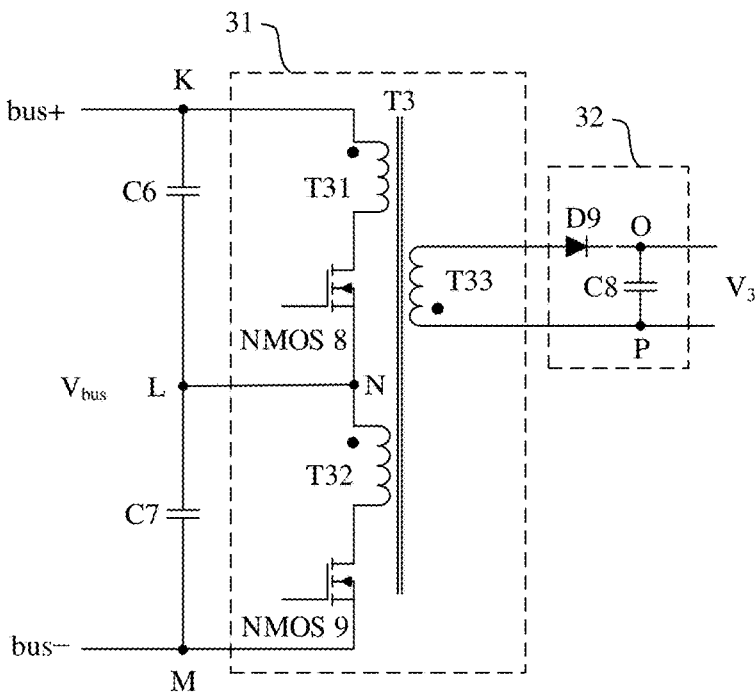
FIG. 8 is a schematic diagram of a structure of a first subsidiary power supply circuit A according to an embodiment.

In a possible implementation, the first subsidiary power supply circuit A may use the following two topology structures:

Structure 1: As shown in FIG. 8, the second conversion module 31 includes a third transformer T3 (including a primary side winding T31, a primary side winding T32, an iron core, and a secondary side winding T33, where the primary side winding T31 and the primary side winding T32 are coupled to the secondary side winding T33 by using the iron core), a sixth switching transistor (for example, a negative-metal-oxide-semiconductor transistor (negative-metal-oxide-semiconductor, NMOS transistor) in FIG. 8, that is, an NMOS 8 in FIG. 8), and a seventh switching transistor (for example, an NMOS transistor in FIG. 8, that is, an NMOS 9 in FIG. 8). The first rectifier module 32 includes a rectifier (for implementing a rectification function, for example, a diode D9 in FIG. 8) and a capacitor C8 (for implementing filtering and energy storage functions).

Further, referring to FIG. 8, both a capacitor C6 and a capacitor C7 are bus capacitors. Two ends of the capacitor C6 are respectively coupled to a node K (the node K is further coupled to a positive end bus+ of a bus) and a node L, and two ends of the capacitor C7 are respectively coupled to a node M (the node M is further coupled to a negative end bus− of the bus, and a voltage between the positive end bus+ and the negative end bus− is a bus voltage $V_{bus}$, which may also be referred to as an input voltage of the first subsidiary power supply circuit A) and the node L, that is, the capacitor C6 and the capacitor C7 are coupled by using the node L. A dotted terminal of the primary side winding T31 is coupled to the node K, a non-dotted terminal of the primary side winding T31 is coupled to a drain of the NMOS 8, and a source of the NMOS 8 is coupled to a node N (the node N is further coupled to the node L). A dotted terminal of the primary side winding T32 is coupled to the node N, a non-dotted terminal of the primary side winding T32 is coupled to a drain of the NMOS 9, and a source of the NMOS 9 is coupled to the node M. A non-dotted terminal of the secondary side winding T33 is coupled to an anode of the diode D9, and a dotted terminal of the secondary side winding T33 is coupled to a node P. A cathode of the diode D9 and one end of the capacitor C8 are both coupled to a node O, and the other end of the capacitor C8 is coupled to the node P (a voltage between the node P and the node O is the output voltage of the first subsidiary power supply circuit A, that is, the third voltage $V_3$). The third voltage $V_3$ may be obtained by using the first subsidiary power supply circuit A shown in FIG. 8, and the first subsidiary power supply circuit A provides the third voltage $V_3$ to the first control module CM 1 (not shown in FIG. 8).

In another possible implementation, the sixth switching transistor and the seventh switching transistor in the first voltage conversion module 31 may also be IGBTs respectively.

Optionally, when the sixth switching transistor is an IGBT, a collector of the IGBT is coupled to the non-dotted terminal of the primary side winding T31, and an emitter of the IGBT is coupled to the node N.

Optionally, when the seventh switching transistor is an IGBT, a collector of the IGBT is coupled to the non-dotted terminal of the primary side winding T32, and an emitter of the IGBT is coupled to the node M.

In another possible implementation, the rectifier in the first rectifier module 32 may be a field effect transistor (which may be a junction field effect transistor or an insulated gate field effect transistor, for example, an NMOS transistor). When the rectifier is an NMOS transistor, a source of the NMOS transistor is coupled to the non-dotted terminal of the secondary side winding T33, and a drain of the NMOS transistor is coupled to the node O.

Figure 9:
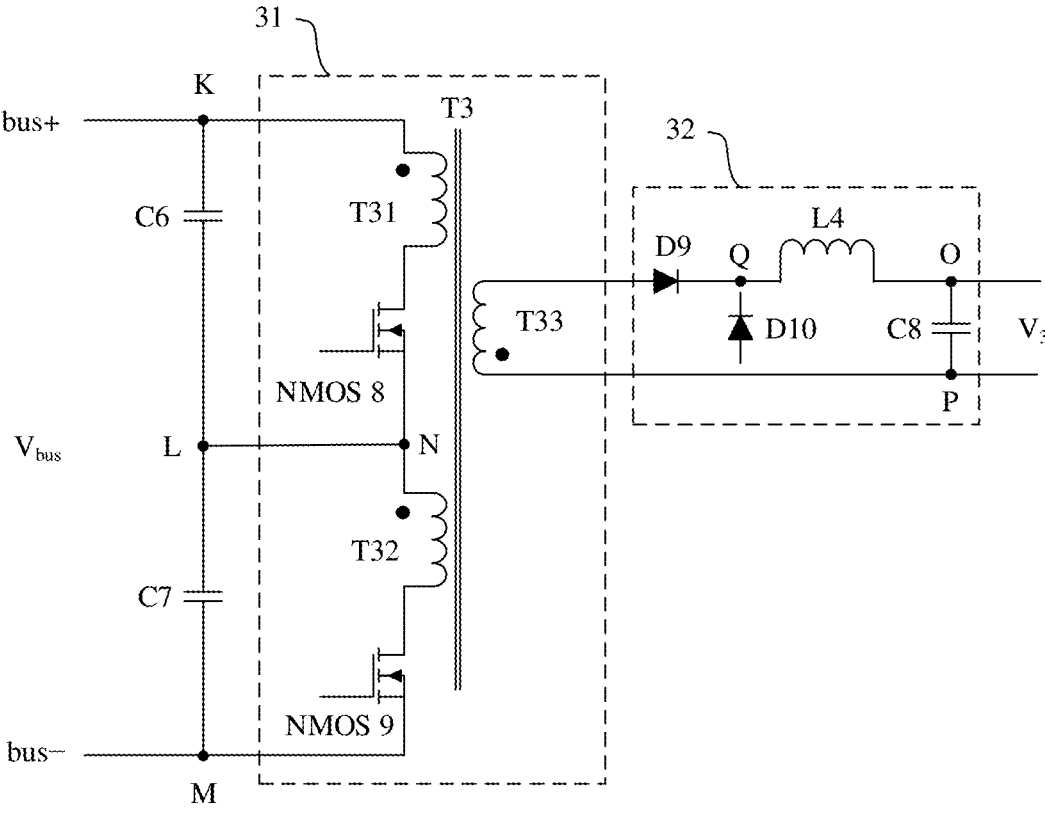
FIG. 9 is a schematic diagram of a structure of a first subsidiary power supply circuit A according to an embodiment.

Structure 2: As shown in FIG. 9, the first voltage conversion module 31 includes a third transformer T3 (including a primary side winding T31, a primary side winding T32, an iron core, and a secondary side winding T33, where the primary side winding T31 and the primary side winding T32 are coupled to the secondary side winding T33 by using the iron core), a sixth switching transistor (an NMOS transistor is used as an example in FIG. 9, that is, an NMOS 8 in FIG. 9), and a seventh switching transistor (an NMOS transistor is used as an example in FIG. 9, that is, an NMOS 9 in FIG. 9). The first rectifier module 32 includes a diode D9, a diode D10, an inductor L4, and a capacitor C8.

Further, referring to FIG. 9, both a capacitor C6 and a capacitor C7 are bus capacitors. Two ends of the capacitor C6 are respectively coupled to a node K (the node K is further coupled to a positive end bus+ of a bus) and a node L, and two ends of the capacitor C7 are respectively coupled to a node M (the node M is further coupled to a negative end bus− of the bus, and a voltage between the positive end bus+ and the negative end bus− is a bus voltage $V_{bus}$, which may also be referred to as an input voltage of the first subsidiary power supply circuit A) and the node L, that is, the capacitor C6 and the capacitor C7 are coupled by using the node L. A dotted terminal of the primary side winding T31 is coupled to the node K, a non-dotted terminal of the primary side winding T31 is coupled to a drain of the NMOS 8, and a source of the NMOS 8 is coupled to a node N (the node N is further coupled to the node L). A dotted terminal of the primary side winding T32 is coupled to the node N, a non-dotted terminal of the primary side winding T32 is coupled to a drain of the NMOS 9, and a source of the NMOS 9 is coupled to the node M. A non-dotted terminal of the secondary side winding T33 is coupled to an anode of the diode D9, and a dotted terminal of the secondary side winding T33 is coupled to a node P. A cathode of the diode D9, one end of the inductor L4, and a cathode of the diode D10 are all coupled to a node Q, the other end of the inductor L4 and one end of the capacitor C8 are both coupled to a node O, and the other end of the capacitor C8 and an anode of the diode D10 are both coupled to the node P (a voltage between the node P and the node O is the output voltage of the first subsidiary power supply circuit A, that is, the third voltage $V_3$). The third voltage $V_3$ may be obtained by using the first subsidiary power supply circuit A shown in FIG. 9, and the first subsidiary power supply circuit A provides the third voltage $V_3$ to the first control module CM 1 (not shown in FIG. 9).

In a possible implementation, the sixth switching transistor and the seventh switching transistor in the first voltage conversion module 31 may also be IGBTs respectively.

Optionally, when the sixth switching transistor is an IGBT, a collector of the IGBT is coupled to the non-dotted terminal of the primary side winding T31, and an emitter of the IGBT is coupled to the node N.

Optionally, when the seventh switching transistor is an IGBT, a collector of the IGBT is coupled to the non-dotted terminal of the primary side winding T32, and an emitter of the IGBT is coupled to the node M.

It should be noted that only two possible topology structures of the first subsidiary power supply circuit are provided in FIG. 8 and FIG. 9. The first voltage conversion module 31 may alternatively use another topology structure. This is not limited in this embodiment.

In this embodiment, the first voltage conversion module 31 and the first rectifier module 32 adjust the voltage of the bus of the PU to the voltage required by the first control module CM 1, thereby reliably supplying power to the first control module CM 1. Because no other isolation device needs to be disposed separately, the power supply costs of the first control module CM 1 are reduced. Because the first subsidiary power supply circuit A is located inside the PU, the size of the PU is also reduced.

Figure 10:
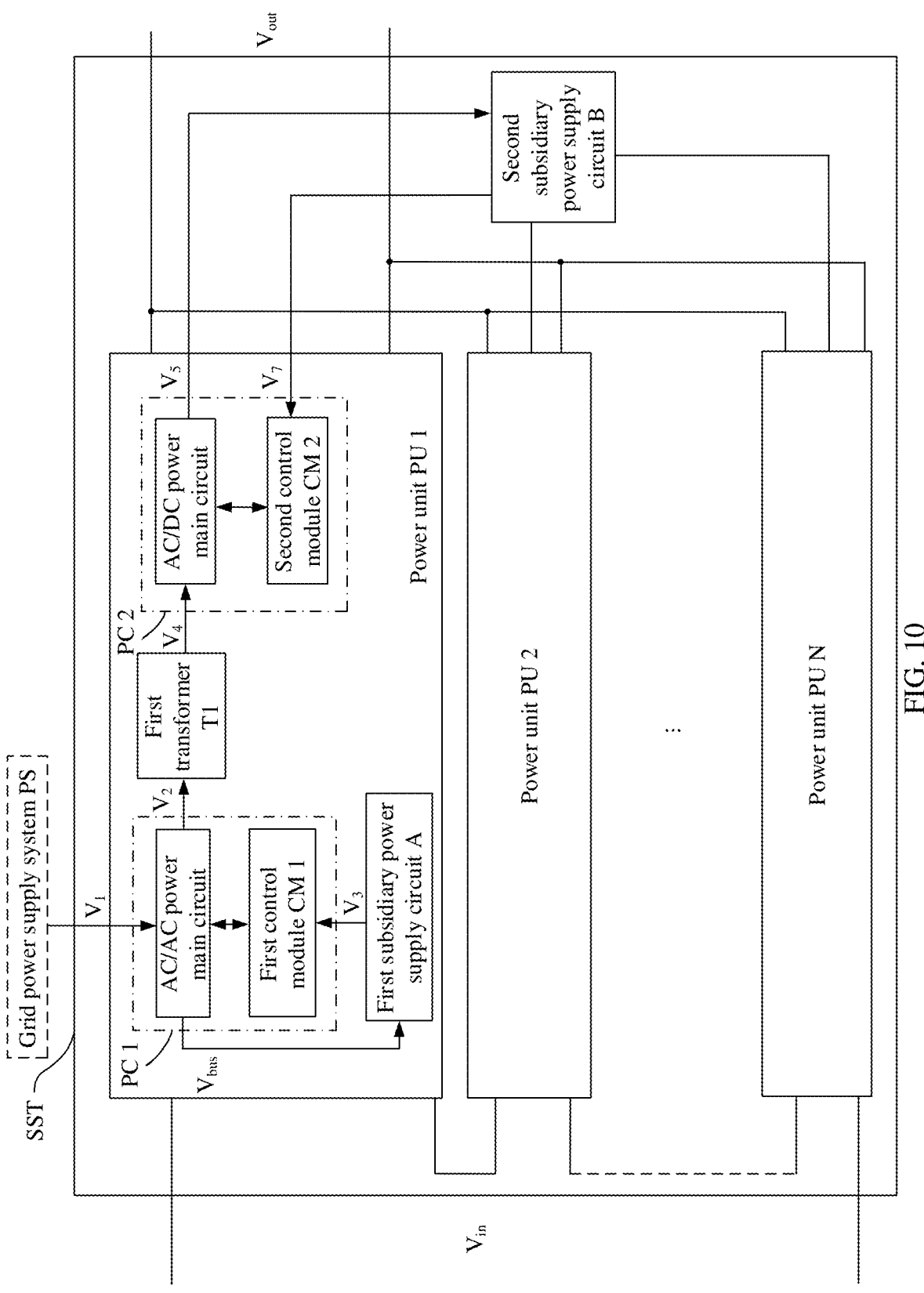
FIG. 10 is a schematic diagram of a structure of a solid-state transformer (SST) according to an embodiment.

An embodiment further provides a SST including the PU shown in FIG. 5, as shown in FIG. 10. In FIG. 10, $V_{in}$ represents an input voltage (such as an alternating current voltage) of the SST, and $V_{out}$ represents an output voltage (such as a direct current voltage) of the SST. The SST may include a second subsidiary power supply circuit B and N Pus (that is, the PU 1, the PU 2, . . . , the PU N in FIG. 10). Input ends of the PU 1, the PU 2, . . . , the PU N are connected in series to form an input end of the SST. Output ends of the PU 1, the PU 2, . . . , the PU N are connected in parallel to form an output end of the SST.

As can be understood from FIG. 10, an input end of the second subsidiary power supply circuit B is coupled to the output end of the AC/DC power main circuit in each PU, and an output end of the second subsidiary power supply circuit B is coupled to the second control module CM 2.

It should be noted that, FIG. 10 shows that the input end of the second subsidiary power supply circuit B is coupled to the output end of the AC/DC power main circuit in the PU 1, and the output end of the second subsidiary power supply circuit B is coupled to the second control module CM 2 in the PU 1. A coupling relationship between the second subsidiary power supply circuit B and the AC/DC power main circuit and second control module CM 2 in any other PU (that is, the PU 2 to PU N) in the SST is the same as the coupling relationship shown in FIG. 10. Details are not described herein again in this embodiment.

Based on FIG. 10 and the foregoing coupling relationship, the second subsidiary power supply circuit B may be configured to adjust the fifth voltage $V_5$ (that is, the direct current voltage output by the AC/DC power main circuit) to a seventh voltage $V_7$ and output the seventh voltage to the second control module CM 2. The seventh voltage $V_7$ may be used to indicate a direct current voltage required by the second control module CM 2 (which may also be considered as an output voltage of the second subsidiary power supply circuit B).

In this embodiment, power is reliably supplied to the second control module CM 2 in the second power circuit PC 2 by using the second subsidiary power supply circuit B, physical isolation is implemented between the second subsidiary power supply circuit B of a centralized structure and the first subsidiary power supply circuit of a distributed structure, and no additional isolation device needs to be disposed for the first subsidiary power supply circuit A and the second subsidiary power supply circuit B. Therefore, costs of the SST are reduced, and a size of the SST is reduced.

Figure 11:
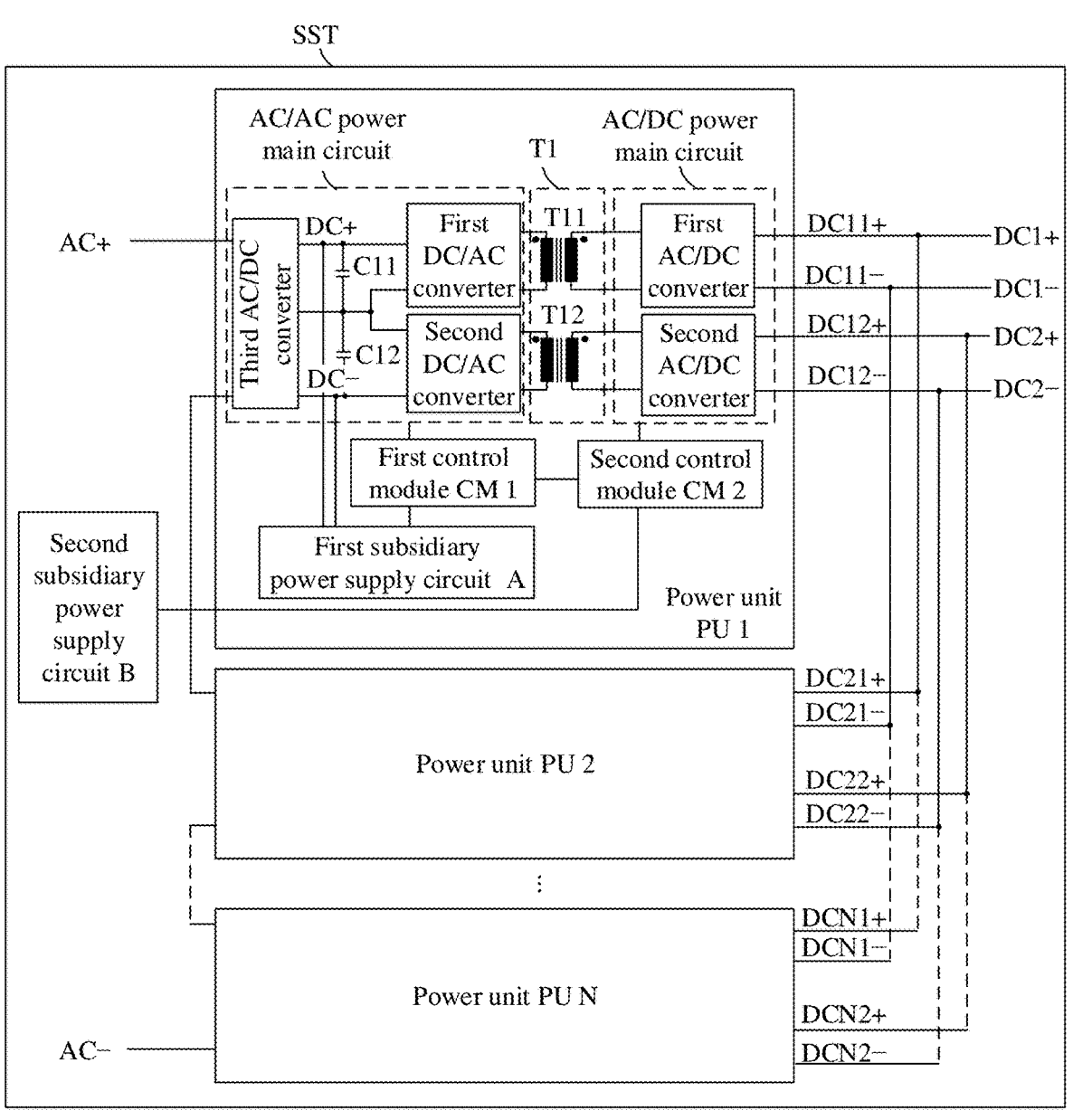
FIG. 11 is a schematic diagram of a structure of another SST according to an embodiment.

As shown in FIG. 11, the AC/AC power main circuit in FIG. 10 (that is, the AC/AC power main circuit in FIG. 11) may include a third AC/DC converter, a first DC/AC converter, and a second DC/AC converter. The first transformer T1 may include a high frequency transformer T11 and a high frequency transformer T12. The AC/DC power main circuit in FIG. 10 (that is, the AC/DC power main circuit in FIG. 11) may include a first AC/DC converter and a second AC/DC converter.

Further, an input end of the third AC/DC converter is coupled to the grid power supply system PS (reflected as AC+ and AC− in FIG. 11), and an output end of the third AC/DC converter is coupled to an input end of the first DC/AC converter and an input end of the second DC/AC converter by using a bus (bus capacitors, that is, a bus capacitor C11 and a bus capacitor C12 in FIG. 11, are disposed on the bus). An output end of the first DC/AC converter is coupled to a primary side winding of the high frequency transformer T11 (that is, a winding of the high frequency transformer T11 close to the first DC/AC converter in FIG. 11), and a secondary side winding of the high frequency transformer T11 (that is, a winding of the high frequency transformer T11 close to the first AC/DC converter in FIG. 11) is coupled to the input end of the first AC/DC converter. Similarly, an output end of the second DC/AC converter is coupled to a primary side winding of the high frequency transformer T12 (that is, a winding of the high frequency transformer T12 close to the second DC/AC converter in FIG. 11), and a secondary side winding of the high frequency transformer T12 (that is, a winding of the high frequency transformer T12 close to the second AC/DC converter in FIG. 11) is coupled to the input end of the second AC/DC converter.

It should be noted that, in FIG. 11, a positive direct current end DC11+ and a negative direct current end DC11− are output ends of a first AC/DC converter (that is, a first AC/DC converter) in the PU 1, and a positive direct current end DC12+ and a negative direct current end DC12− are output ends of a second AC/DC converter (that is, a second AC/DC converter) in the PU 1. A positive direct current end DC21+ and a negative direct current end DC21− are output ends of a first AC/DC converter in the PU 2, and a positive direct current end DC22+ and a negative direct current end DC22− are output ends of a second AC/DC converter in the PU 2. A positive direct current end DCN1+ and a negative direct current end DCN1− are output ends of a first AC/DC converter in the PU N, and a positive direct current end DCN2+ and a negative direct current end DCN2− are output ends of a second AC/DC converter in the PU N. Because the output ends of the N Pus are connected in parallel, positive direct current ends (that is, positive direct current ends DC11+ to DCN1+) of the first AC/DC converters of the PU 1 to PU N are coupled, and negative direct current ends (that is, negative direct current ends DC11− to DCN1−) of the first AC/DC converters of the PU 1 to PU N are coupled. In addition, positive direct current ends (that is, positive direct current ends DC12+ to DCN2+) of the second AC/DC converters of the PU 1 to PU N are coupled, and negative direct current ends (that is, negative direct current ends DC12− to DCN2−) of the second AC/DC converters of the PU 1 to PU N are coupled. In addition, a plurality of output ends of the SST are formed (for example, the positive direct current end DC1+, the negative direct current end DC1−, the positive direct current end DC2+, and the negative direct current end DC2− in FIG. 11).

As can be understood from FIG. 10 and FIG. 11, in this embodiment, the first subsidiary power supply circuit A supplies power to the first control module CM 1, and the second subsidiary power supply circuit B supplies power to the second control module CM 2. The first subsidiary power supply circuit A is located inside the PU, and physical isolation is implemented between the first subsidiary power supply circuit A and the second subsidiary power supply circuit B. Therefore, power supply costs of the first CM 1 and the second CM 2 in the SST are reduced.

Figure 12:
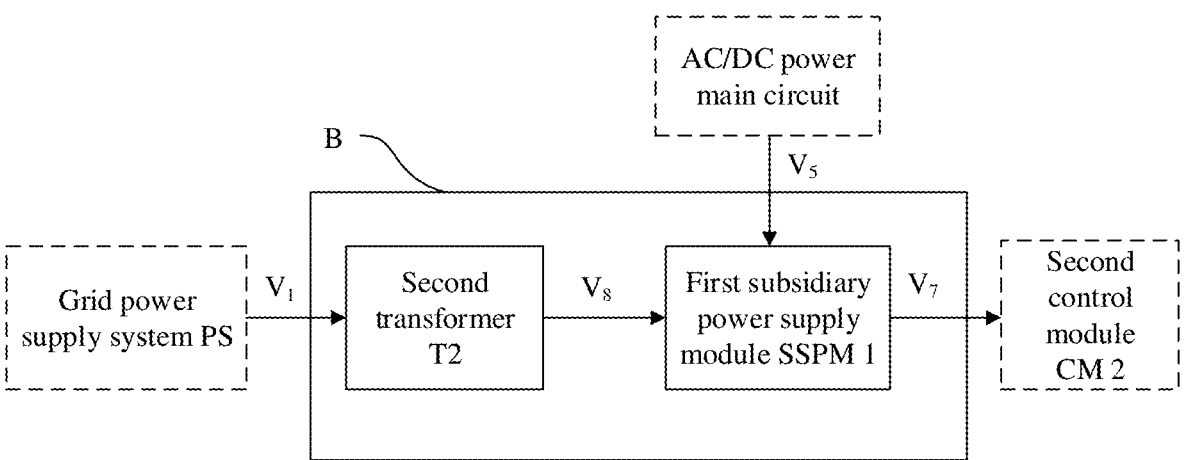
FIG. 12 is a schematic diagram of a structure of a second subsidiary power supply circuit B according to an embodiment.

In a possible implementation, as shown in FIG. 12, the second subsidiary power supply circuit B may include a second transformer T2 and a first subsidiary power supply module SSPM (subsidiary power supply module) 1.

As can be understood from FIG. 12, an input end of the second transformer T2 is coupled to the grid power supply system PS, and an output end of the second transformer T2 is coupled to an input end of the first subsidiary power supply module SSPM 1. The input end of the first subsidiary power supply module SSPM 1 is further coupled to the output end of the AC/DC power main circuit of the PU. An output end of the first subsidiary power supply module SSPM 1 is coupled to the second control module CM 2 of the PU.

Based on the foregoing coupling relationship, it may be further determined that the second transformer T2 may be configured to adjust the first voltage $V_1$ from the grid power supply system PS to an eighth voltage $V_8$ (that is, an alternating current voltage required by the first subsidiary power supply module SSPM 1, where the eighth voltage $V_8$ is an alternating current voltage and may be 144 V to 264 V), and output the eighth voltage to the first subsidiary power supply module SSPM 1. It should be noted that a voltage value of the first voltage $V_1$ is greater than a voltage value of the eighth voltage $V_8$. In other words, the second transformer T2 implements a step-down function, that is, the first voltage $V_1$ from the grid power supply system may be stepped down to the second voltage $V_8$ by using the second transformer T2.

It may be further determined that the first subsidiary power supply module SSPM 1 may be configured to adjust the eighth voltage $V_8$ and the fifth voltage $V_5$ from the AC/DC power main circuit to the seventh voltage $V_7$, and output the seventh voltage to the second control module CM 2 (that is, the first subsidiary power supply module SSPM 1 supplies power to the second control module CM 2).

The second transformer T2 may be a transformer of another type in addition to an industrial frequency transformer. This is not limited in this embodiment.

In this embodiment, power is reliably supplied to the second control module CM 2 by using the second transformer T2 and the first subsidiary power supply module SSPM 1, and further, reliable driving of the switching transistor in the AC/DC power main circuit is implemented. Therefore, stability of the PU is improved, and operation stability of the SST is further improved.

In a possible implementation, a fan for heat dissipation in the PU may be disposed for the PU. On this basis, the second subsidiary power supply circuit B may further include at least one second subsidiary power supply module SSPM 2 (in FIG. 13, for example, the second subsidiary power supply circuit B includes two second subsidiary power supply modules SSPMs 2 (that is, a second subsidiary power supply module SSPM 21 and a second subsidiary power supply module SSPM 22)), as shown in FIG. 13.

Figure 13:
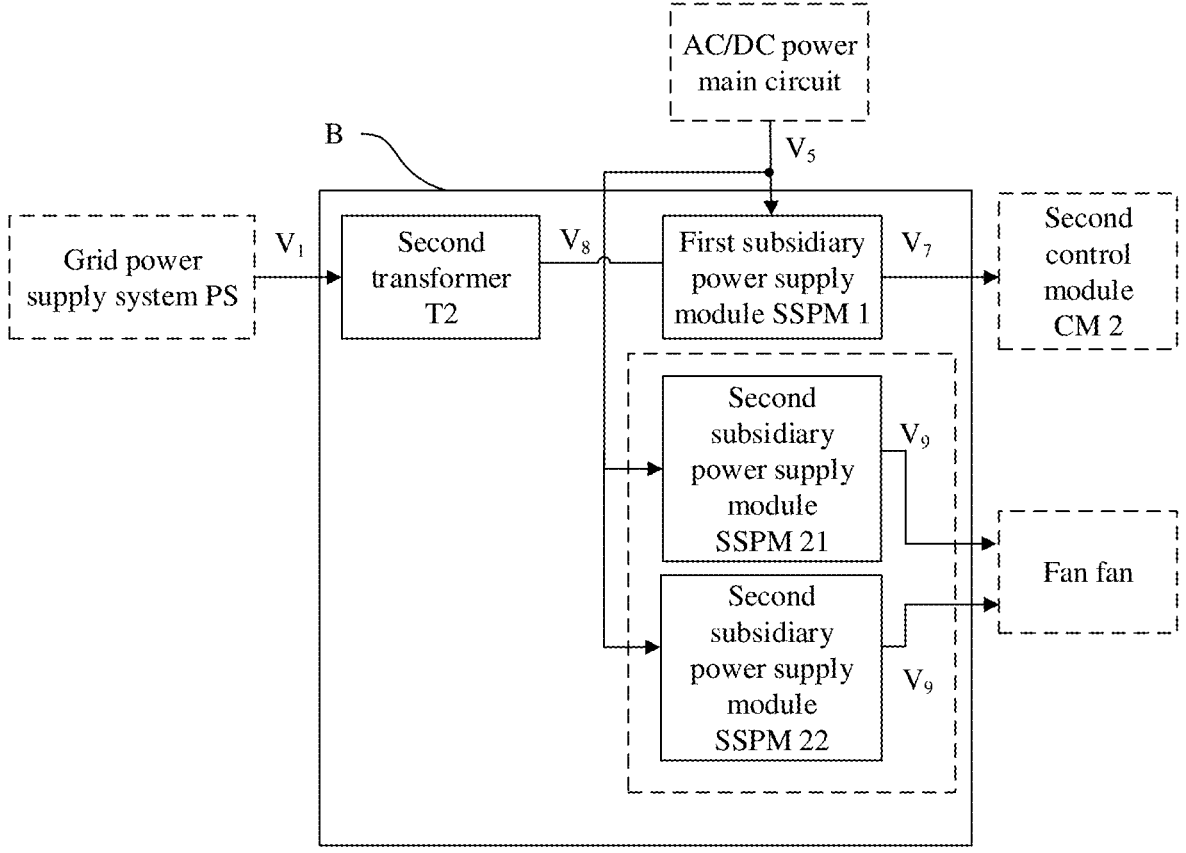
FIG. 13 is a schematic diagram of a structure of a second subsidiary power supply circuit B according to an embodiment.

As can be understood from FIG. 13, an input end of each of the second subsidiary power supply modules SSPMs 2 is coupled to the output end of the AC/DC power main circuit, and an output end of each second subsidiary power supply module is coupled to the fan.

In other words, the input end of the second subsidiary power supply module SSPM 21 and the input end of the second subsidiary power supply module SSPM 22 are respectively coupled to the output end of the AC/DC power main circuit, and the output end of the second subsidiary power supply module SSPM 21 and the output end of the second subsidiary power supply module SSPM 22 are coupled to the fan.

Based on FIG. 13 and the foregoing coupling relationship, each of the second subsidiary power supply modules SSPMs 2 may be configured to adjust the fifth voltage $V_5$ to a ninth voltage $V_9$ (that is, a voltage required by the fan, which may also be considered as an output voltage of each of the second subsidiary power supply modules SSPMs 2), and output the ninth voltage to the fan (which may include the fan 1 in FIG. 6 and FIG. 13 and a fan 2 of the SST (because heat dissipation of the SST is implemented by a fan disposed on a top of the SST, the fan 2 may be referred to as a top air exhaust fan of the SST)).

In other words, the second subsidiary power supply module SSPM 21 may adjust the fifth voltage $V_5$ to the ninth voltage $V_9$ and output the ninth voltage to the fan. Similar to the second subsidiary power supply module SSPM 21, the second subsidiary power supply module SSPM 22 may also adjust the fifth voltage $V_5$ to the ninth voltage $V_9$ and output the ninth voltage to the fan.

The at least one second subsidiary power supply module SSPM 2 in this embodiment can adjust the output voltage of the AC/DC power main circuit to the voltage required by the fan, that is, supply power to the fan, so that the fan can stably dissipate heat for the PU.

In addition, each of the second subsidiary power supply modules SSPMs 2 (such as the second subsidiary power supply module SSPM 21 and the second subsidiary power supply module SSPM 22) further needs to supply power to the third control module CM 3 in the PACK A shown in FIG. 6.

Because an output voltage of the SST has a plurality of voltage values, such as 400 V and 800 V, the second subsidiary power supply circuit B provided in this embodiment can match an input voltage of the second subsidiary power supply circuit B with the output voltage of the SST by using a plurality of (for example, two) second subsidiary power supply modules SSPMs 2. The second subsidiary power supply circuit B can supply subsidiary power to the PU reliably based on different output voltages of the SST (that is, the second subsidiary power supply circuit B can supply power to the second control module CM 2 based on different output voltages of the PU). This further improves stability of the SST. In addition, the at least one second subsidiary power supply module SSPM 2 in the second subsidiary power supply circuit B can adjust the output voltage of the AC/DC power main circuit to the voltage required by the fan, that is, supply power to the fan, so that the fan can stably dissipate heat for the PU.

It should be noted that, because a quantity of second subsidiary power supply modules in the second subsidiary power supply modules may be equal to a quantity of AC/DC converters in the AC/DC power main circuit, the following describes a coupling relationship between the AC/DC power main circuit and the second subsidiary power supply circuit B in detail by using an example in which the AC/DC power main circuit includes one AC/DC converter and the second subsidiary power supply circuit B includes one second subsidiary power supply module.

Figure 14:
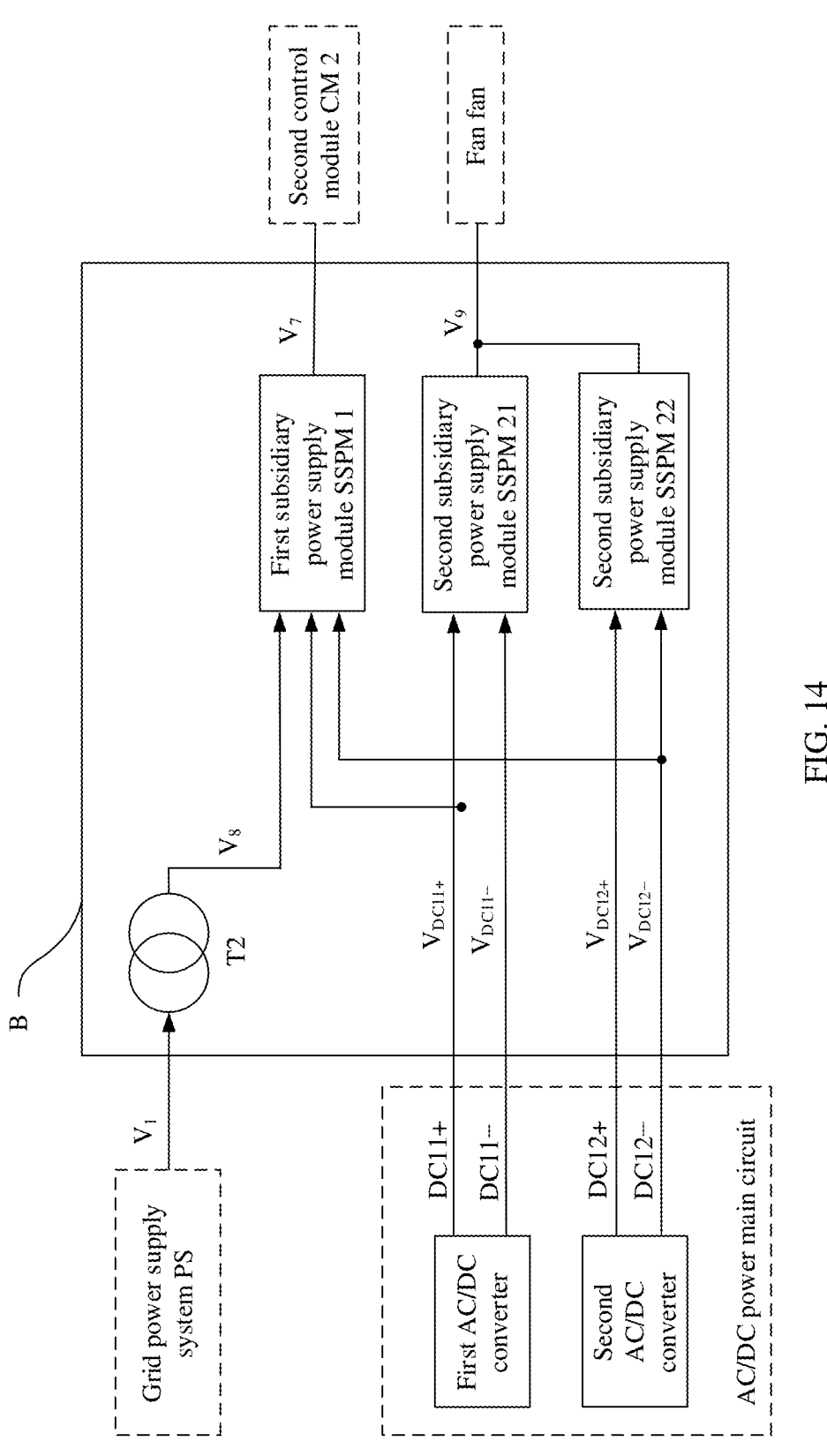
FIG. 14 is a schematic diagram of a structure of a second subsidiary power supply circuit B according to an embodiment.

As shown in FIG. 14, the input end of the second transformer T2 is coupled to the grid power supply system PS, and the output end of the second transformer T2 is coupled to the input end of the first subsidiary power supply module SSPM 1. Therefore, the second transformer T2 may be configured to adjust the first voltage $V_1$ from the grid power supply system PS to the eighth voltage $V_8$ and output the eighth voltage to the first subsidiary power supply module SSPM 1. In this embodiment, a size of a body of the second transformer T2 is less than 305 mm×475 mm×190 mm. A primary side coil and a secondary side coil of the second transformer T2 are insulated by injecting epoxy resin for sealing.

The second transformer T2 obtains one line voltage (that is, the first voltage $V_1$) from the grid power supply system PS, and outputs a voltage (that is, the eighth voltage $V_8$). The output voltage is provided only to the first subsidiary power supply module SSPM 1. The second transformer T2 has low power and a small size, featuring low costs. Therefore, reliability of the SST can be improved.

Referring to FIG. 14, the input end of the first subsidiary power supply module SSPM 1 is coupled to the output end of the second transformer T2, the positive direct current end DC11+ of the first AC/DC converter in the AC/DC power main circuit, and the negative direct current end DC11− of the first AC/DC converter in the AC/DC power main circuit, and the output end of the first subsidiary power supply module SSPM 1 is coupled to the second control module CM 2.

Therefore, it may be further determined that the first subsidiary power supply module SSPM 1 is configured to obtain the eighth voltage $V_8$ from the second transformer T2 and obtain a direct current voltage $V_{DC11+}$ and a direct current voltage $V_{DC11−}$ from the positive direct current end DC11+ of the first AC/DC converter. On a basis that the first subsidiary power supply module SSPM 1 obtains the second voltage $V_2$, the direct current voltage $V_{DC11+}$, and the direct current voltage $V_{DC11−}$, the first subsidiary power supply module SSPM 1 may adjust the second voltage $V_2$, the direct current voltage $V_{DC11+}$, and the direct current voltage $V_{DC11−}$ to the seventh voltage $V_7$ (that is, the output voltage of the first subsidiary power supply module SSPM 1). The output end of the first subsidiary power supply module SSPM 1 is coupled to the second control module CM 2 to provide the seventh voltage $V_7$ to the second control module CM 2.

Still referring to FIG. 14, the input end of the second subsidiary power supply module SSPM 21 is coupled to the positive direct current end DC11+ of the first AC/DC converter and the negative direct current end DC11− of the first AC/DC converter, and the output end of the second subsidiary power supply module SSPM 21 is coupled to the fan. Similar to the second subsidiary power supply module SSPM 21, the input end of the second subsidiary power supply module SSPM 22 is coupled to the positive direct current end DC12+ of the second AC/DC converter and the negative direct current end DC12− of the second AC/DC converter, and the output end of the second subsidiary power supply module SSPM 22 is coupled to the fan.

Therefore, it may be further determined that the second subsidiary power supply module SSPM 21 is configured to obtain the direct current voltage $V_{DC11+}$ from the first AC/DC converter from the positive direct current end DC11+ of the first AC/DC converter, and obtain the direct current voltage $V_{DC11−}$ from the first AC/DC converter from the negative direct current end DC11− of the first AC/DC converter. On a basis that the second subsidiary power supply module SSPM 21 obtains the direct current voltage $V_{DC11+}$ and the direct current voltage $V_{DC11−}$, the second subsidiary power supply module SSPM 21 may adjust the direct current voltage $V_{DC11+}$ and the direct current voltage $V_{DC11−}$ to the ninth voltage V9 and output the ninth voltage to the fan. Similar to the second subsidiary power supply module SSPM 21, the second subsidiary power supply module SSPM 22 is configured to obtain a direct current voltage $V_{DC12+}$ from the second AC/DC converter from the positive direct current end DC12+ of the second AC/DC converter, and obtain a direct current voltage $V_{DC12−}$ from the second AC/DC converter from the negative direct current end DC12− of the second AC/DC converter. On a basis that the second subsidiary power supply module SSPM 22 obtains the direct current voltage $V_{DC12+}$ and the direct current voltage $V_{DC12−}$, the second subsidiary power supply module SSPM 22 may adjust the direct current voltage $V_{DC12+}$ and the direct current voltage $V_{DC12−}$ to the ninth voltage V9 and output the ninth voltage to the fan.

It should be noted that, because the input voltage of the PU may be a medium voltage (an alternating current), and the output voltage of the PU may be a low voltage (a direct current), and because the input ends of the first subsidiary power supply module SSPM 1 and the second subsidiary power supply module SSPM 2 may be coupled to the output end of the corresponding PU, the first subsidiary power supply module SSPM 1 and the second subsidiary power supply module SSPM 2 may be referred to as low voltage subsidiary power supply modules.

In an example, output power of the second transformer T2 in FIG. 13 and FIG. 14 is relatively low, and output power of the second subsidiary power supply module SSPM 2 is relatively high. The output power of the second transformer T2 may be higher than output power of the first subsidiary power supply module SSPM 1, and the output power of the first subsidiary power supply module SSPM 1 may be lower than the output power of the second subsidiary power supply module SSPM 2. For example, the output power of the first subsidiary power supply module SSPM 1 may be 200 W, the output power of the second transformer T2 may be 500 W, and the output power of the second subsidiary power supply module SSPM 2 may be 500 W or 600 W.

In another example, an input voltage (which may be $V_8$, $V_{DC11+}$, and $V_{DC11−}$ in FIG. 14) of the first subsidiary power supply module SSPM 1 in FIG. 14 may be 114 V to 840 V. An input voltage (which may be $V_{DC11+}$ and $V_{DC11−}$ in FIG. 14) of the second subsidiary power supply module SSPM 21 may be 400 V. An input voltage (which may be $V_{DC12+}$ and $V_{DC12−}$ in FIG. 14) of the second subsidiary power supply module SSPM 22 may be 400 V.

It should be noted that, if the positive direct current end DC11+ and the positive direct current end DC12+ in FIG. 14 are connected, and the negative direct current end DC11− and the negative direct current end DC12− are connected, but other connection relationships remain unchanged, an 800 V input voltage of the second subsidiary power supply circuit B may be achieved.

Therefore, the second subsidiary power supply circuit in this embodiment can be compatible with the 400 V and 800 V dual-output SST, and there is no need to separately design a 400 V subsidiary power supply circuit or an 800 V subsidiary power supply circuit. The input voltage of the second subsidiary power supply circuit in this embodiment may be at a plurality of voltage levels (for example, 400 V and 800 V), the topology structure is simple, and the costs are low. This further reduces the costs of the SST. In addition, an input power supply of the second subsidiary power supply circuit in this embodiment does not depend on a configuration scenario other than a battery or mains scenario or the like and can work normally in the battery or mains scenario or the like.

Because the SST has two output voltages: 400 V and 800 V, the second subsidiary power supply circuit in this embodiment can match the input voltage of the second subsidiary power supply circuit with the output voltage of the SST by using the second subsidiary power supply module SSPM 21 and the second subsidiary power supply module SSPM 22 in FIG. 14. The second subsidiary power supply circuit can reliably supply subsidiary power to the SST (or the PU) based on different output voltages of the SST. This further improves stability of the SST (or the PU).

It should be noted that when the input of the second subsidiary power supply circuit is established but the output of the PU is not established, all the second subsidiary power supply modules in the second subsidiary power supply circuit work, and the first subsidiary power supply module in the first subsidiary power supply circuit works, but none of the second subsidiary power supply modules in the first subsidiary power supply circuit works. When the input of the second subsidiary power supply circuit is established and the output of the PU is also established, all subsidiary power supply modules (that is, the first subsidiary power supply module and all the second subsidiary power supply modules) work. In this case, the first subsidiary power supply module is powered by the output of the PU.

In a transformation system including a plurality of SSTs, a first subsidiary power supply module SSPM 1 in one of the SSTs and a first subsidiary power supply module in another SST may be mutually redundant (which may also be referred to as mutual backup). When the transformation system includes only a single SST (the SST includes two second subsidiary power supply modules), a failure of either of the second subsidiary power supply modules does not cause shutdown of the first subsidiary power supply circuit, and the failed second subsidiary power supply module can be quickly replaced. Therefore, stability of the PU is improved, and further, reliable operation of the SST is implemented. When the transformation system includes more than two SSTs, replacement of any second subsidiary power supply module does not cause shutdown of the transformation system. In addition, the first subsidiary power supply module and the second subsidiary power supply module in the second subsidiary power supply circuit are respectively provided with a hot swap interface, and hot swap is supported. The first subsidiary power supply circuit provided in this embodiment can effectively improve stability and a maintenance speed of the transformation system.

Figure 15:
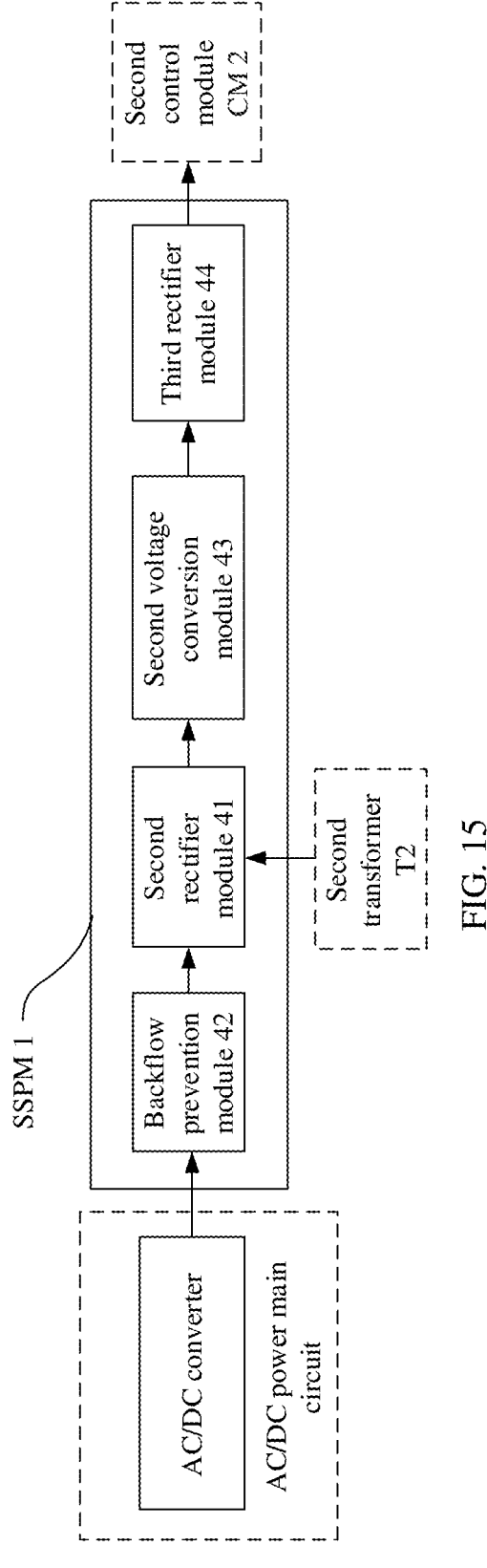
FIG. 15 is a schematic diagram of a structure of a first subsidiary power supply module SSPM 1 according to an embodiment.

As shown in FIG. 15, the first subsidiary power supply module SSPM 1 may include a second rectifier module 41, a backflow prevention module 42, a second voltage conversion module 43, and a third rectifier module 44.

As can be understood from FIG. 15, an input end of the backflow prevention module 42 may be coupled to the output end of the AC/DC power main circuit (which may be an AC/DC converter in the AC/DC power main circuit), an output end of the backflow prevention module 42 may be coupled to an input end of the second rectifier module 41, the input end of the second rectifier module 41 may be further coupled to the second transformer T2, an output end of the second rectifier module 41 may be coupled to an input end of the second voltage conversion module 43, an output end of the second voltage conversion module 43 may be coupled to an input end of the third rectifier module 44, and an output end of the third rectifier module 44 may be coupled to the second control module CM 2 (the output end of the third rectifier module 44 may be coupled to the second detection circuit 21 of the second control module CM 2).

Based on FIG. 15 and the foregoing coupling relationship, it may be further determined that:

the second rectifier module 41 may be configured to convert the fifth voltage $V_5$ (that is, an alternating current from the AC/DC converter in the AC/DC power main circuit) and the eighth voltage $V_8$ (that is, the output voltage of the second transformer T2) into an eleventh voltage $V_{11}$ (that is, a direct current voltage output by the second rectifier module 41), and output the eleventh voltage to the second voltage conversion module 42.

Optionally, the backflow prevention module 42 may be configured to prevent the eleventh voltage $V_{11}$ from the second rectifier module 41 from backflowing to the AC/DC power main circuit (which may be an AC/DC converter in the AC/DC power main circuit).

Optionally, the second voltage conversion module 43 may be configured to perform chopping processing on the eleventh voltage $V_{11}$, perform voltage level (that is, voltage value) conversion (for example, perform voltage step-down on the eleventh voltage $V_{11}$) to obtain a twelfth voltage $V_{12}$ (that is, an alternating current voltage output by the second voltage conversion module 43), and output the twelfth voltage $V_{12}$ to the third rectifier module 44.

Optionally, the third rectifier module 44 may be configured to rectify the twelfth voltage $V_{12}$ to obtain the seventh voltage $V_7$ (that is, a direct current voltage output by the third rectifier module 44, also the direct current voltage required by the second control module CM 2) and provide the seventh voltage $V_7$ to the second control module CM 2.

Figures 16, 17:
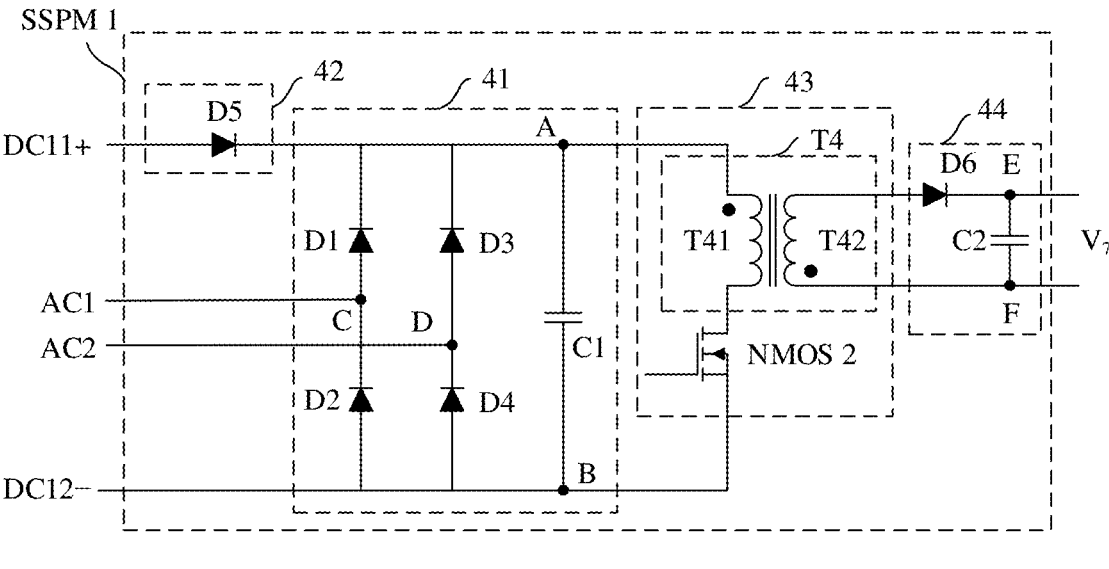
FIG. 16 is a schematic diagram of a structure of a first subsidiary power supply module SSPM 1 according to an embodiment.
FIG. 17 is a schematic diagram of a structure of a first subsidiary power supply module SSPM 1 according to an embodiment.

Further, the input end of the second rectifier module 41 is coupled to an output end of an AC/DC converter in the AC/DC power main circuit by using the backflow prevention module 42 (herein assuming that the AC/DC power main circuit includes two AC/DC converters (that is, the first AC/DC converter and the second AC/DC converter in FIG. 14), the output end of the AC/DC converter is reflected as the positive direct current end DC11+ of the first AC/DC converter and the negative direct current end DC12− of the second AC/DC converter in FIG. 16). In addition, the input end of the second rectifier module 41 is coupled to the output end of the second transformer T2 in the second subsidiary power supply circuit B (the second transformer T2 is not shown in FIG. 16, and the output end of the second transformer T2 is an alternating current end AC1 (which may be AC+ or AC−) and an alternating current end AC2 (which corresponds to AC1, and may be AC− or AC+) of the second rectifier module 41 in FIG. 16). The output end of the second rectifier module 41 is coupled to the input end of the third rectifier module 44 by using the second voltage conversion module 43, and the output end of the third rectifier module 44 is coupled to the second control module CM 2.

In a possible implementation, the foregoing first subsidiary power supply module SSPM 1 may have the following two topology structures:

Structure 1: As shown in FIG. 16, the backflow prevention module 42 may include a first switching transistor (for implementing a backflow prevention function, for example, a diode D5 in FIG. 16). The second rectifier module 41 may include a diode D1, a diode D2, a diode D3, a diode D4, and a capacitor C1 (the capacitor C1 implements functions of rectification, filtering, and energy storage). The second voltage conversion module 43 may include a fourth transformer T4 and a second switching transistor (for example, an NMOS transistor in FIG. 16, that is, an NMOS 2 in FIG. 16), where the fourth transformer T4 includes a primary side winding T41 and a secondary side winding T42 (it should be noted that the fourth transformer T4 further includes an iron core, and the primary side winding T41 is coupled to the secondary side winding T42 by using the iron core). The third rectifier module 44 may include a rectifier (for implementing a rectification function, for example, a diode D6 in FIG. 18) and a capacitor C2 (for implementing functions of filtering and resistance-capacitance).

Further, referring to FIG. 16, an anode of the diode D5 is coupled to the positive direct current end DC11+, and a cathode of the diode D5 is coupled to a node A. After the diode D1 and the diode D2 are connected in series, one end is coupled to the node A, the other end is coupled to a node B, and the node B is coupled to the negative direct current end DC12−. In addition, a connection point (a node C in FIG. 16) between the diode D1 and the diode D2 is coupled to the alternating current end AC1. After the diode D3 and the diode D4 are connected in series, one end is coupled to the node A, and the other end is coupled to the node B. In addition, a connection point (a node D in FIG. 16) between the diode D3 and the diode D4 is coupled to the alternating current end AC2. Two ends of the capacitor C1 are respectively coupled to the node A and the node B. Herein, the diode D1 and the diode D2 connected in series, the diode D3 and the diode D4 connected in series, and the capacitor C1 may be connected in parallel. A dotted terminal of the primary side winding T41 is coupled to the node A, and a non-dotted terminal of the primary side winding T41 is coupled to a drain of an NMOS2. A source of the NMOS 1 is coupled to the node B. An anode of the diode D6 is coupled to a non-dotted terminal of the secondary side winding T42, a cathode of the diode D6 is coupled to a node E, a dotted terminal of the secondary side winding T42 is coupled to a node F, and two ends of the capacitor C2 are respectively coupled to the node E and the node F. The seventh voltage $V_7$ may be obtained by using the first subsidiary power supply module SSPM 1 shown in FIG. 16, and the first subsidiary power supply module SSPM 1 provides the seventh voltage $V_7$ to the second control module CM 2 (not shown in FIG. 16).

It should be noted that, in FIG. 16, the dotted terminal of the primary side winding T41 is coupled to the node A, and the non-dotted terminal of the primary side winding T41 is coupled to the node B by using the NMOS 2, and the non-dotted terminal of the secondary side winding T42 is coupled to the node E by using the diode D6, and a dotted terminal of the secondary side winding T42 is coupled to the node F. Therefore, the first subsidiary power supply module SSPM 1 shown in FIG. 16 has a flyback topology structure.

In a possible implementation, the first switching transistor in the backflow prevention module 42 may alternatively be a triode or a field effect transistor (which may be a junction field effect transistor or an insulated gate field effect transistor, for example, an NMOS transistor).

Optionally, when the first switching transistor is a triode, a collector of the triode is coupled to the positive direct current end DC11+, and an emitter of the triode is coupled to the node A.

Optionally, when the first switching transistor is an NMOS transistor (it may be understood that the diode D5 in FIG. 16 is replaced with an NMOS transistor), a source of the NMOS transistor is coupled to the positive direct current end DC11+, and a drain of the NMOS transistor is coupled to the node A. It should be noted that, an anode of a body diode of the NMOS transistor faces the positive direct current end DC11+, and a cathode of the body diode of the NMOS transistor faces the node A.

In another possible implementation, the second switching transistor in the second voltage conversion module 43 may alternatively be an IGBT. Herein, it may be understood that the NMOS 1 in FIG. 16 is replaced with an IGBT. When the second switching transistor is an IGBT, a collector of the IGBT is coupled to the non-dotted terminal of the primary side winding T41, and an emitter of the IGBT is coupled to the node B.

In still another possible implementation, the rectifier in the third rectifier module 44 may be a field effect transistor (which may be a junction field effect transistor or an insulated gate field effect transistor, for example, an NMOS transistor). When the rectifier is an NMOS transistor, a source of the NMOS transistor is coupled to the non-dotted terminal of the secondary side winding T42, and a drain of the NMOS transistor is coupled to the node E.

Structure 2: As shown in FIG. 17, the backflow prevention module 42 may include a first switching transistor (for implementing a backflow prevention function, for example, a diode D5 in FIG. 17). The second rectifier module 41 may include a diode D1, a diode D2, a diode D3, a diode D4, and a capacitor C1 (the capacitor C1 implements functions of rectification, filtering, energy storage, and resistance-capacitance). The second voltage conversion module 43 may include a fourth transformer T4 and a second switching transistor (for example, an NMOS transistor in FIG. 17, that is, an NMOS 1 in FIG. 19), where the fourth transformer T4 includes a primary side winding T41 and a secondary side winding T42 (it should be noted that the fourth transformer T4 further includes an iron core, and the primary side winding T41 is coupled to the secondary side winding T42 by using the iron core). The third rectifier module 44 may include a diode D6, a diode D7, an inductor L1, and a capacitor C2.

Further, referring to FIG. 17, an anode of the diode D5 is coupled to the positive direct current end DC11+, and a cathode of the diode D5 is coupled to a node A. After the diode D1 and the diode D2 are connected in series, one end is coupled to the node A, the other end is coupled to a node B, and the node B is coupled to the negative direct current end DC12−. In addition, a connection point (a node C in FIG. 17) between the diode D1 and the diode D2 is coupled to the alternating current end AC1. After the diode D3 and the diode D4 are connected in series, one end is coupled to the node A, and the other end is coupled to the node B. In addition, a connection point (a node D in FIG. 17) between the diode D3 and the diode D4 is coupled to the alternating current end AC2. Two ends of the capacitor C1 are respectively coupled to the node A and the node B. Herein, the diode D1 and the diode D2 connected in series, the diode D3 and the diode D4 connected in series, and the capacitor C1 may be connected in parallel. A dotted terminal of the primary side winding T41 is coupled to the node A, a non-dotted terminal of the primary side winding T41 is coupled to a drain of the NMOS 1, and a source of the NMOS 1 is coupled to the node B. An anode of the diode D6 is coupled to a dotted terminal of the secondary side winding T42, a cathode of the diode D6 is coupled to a node E, and a non-dotted terminal of the secondary side winding T42 is coupled to a node F. An anode of the diode D7 is coupled to the node F, and a cathode of the diode D7 is coupled to the node E. Two ends of the inductor L1 are respectively coupled to the node E and a node G. Two ends of the capacitor C2 are respectively coupled to the node G and the node F. The seventh voltage $V_7$ may be obtained by using the first subsidiary power supply module SSPM 1 shown in FIG. 17, and the first subsidiary power supply module SSPM 1 provides the seventh voltage $V_7$ to the second control module CM 2 (not shown in FIG. 17).

It should be noted that, in FIG. 17, the dotted terminal of the primary side winding T41 is coupled to the node A, and the non-dotted terminal of the primary side winding T41 is coupled to the node B by using an NMOS 2, and the dotted terminal of the secondary side winding T42 is coupled to the node E by using the diode D6, and the non-dotted terminal of the secondary side winding T42 is coupled to the node F. Therefore, the first subsidiary power supply module SSPM 1 shown in FIG. 17 has a forward topology structure.

In a possible implementation, the first switching transistor in the backflow prevention module 42 may alternatively be a triode or a field effect transistor (which may be a junction field effect transistor or an insulated gate field effect transistor, for example, an NMOS transistor).

Optionally, when the first switching transistor is a triode, a collector of the triode is coupled to the positive direct current end DC11+, and an emitter of the triode is coupled to the node A.

Optionally, when the first switching transistor is an NMOS transistor (it may be understood that the diode D5 in FIG. 17 is replaced with an NMOS transistor), a source of the NMOS transistor is coupled to the positive direct current end DC11+, and a drain of the NMOS transistor is coupled to the node A. It should be noted that, an anode of a body diode of the NMOS transistor faces the positive direct current end DC11+, and a cathode of the body diode of the NMOS transistor faces the node A.

In another possible implementation, the second switching transistor in the second voltage conversion module 43 may alternatively be an IGBT. Herein, it may be understood that the NMOS 1 in FIG. 17 is replaced with an IGBT. When the second switching transistor is an IGBT, a collector of the IGBT is coupled to the non-dotted terminal of the primary side winding T41, and an emitter of the IGBT is coupled to the node B.

It should be noted that, in FIG. 16 and FIG. 17, an anode of the diode D1 and a cathode of the diode D2 are both coupled to the node C, and an anode of the diode D3 and a cathode of the diode D4 are both coupled to the node D, and a cathode of the diode D1 and a cathode of the diode D3 are both coupled to the node A, and an anode of the diode D2 and an anode of the diode D4 are both coupled to the node B.

It should also be noted that only two possible topology structures of the first subsidiary power supply module SSPM 1 are provided in FIG. 16 and FIG. 17. The first subsidiary power supply module SSPM 1 may alternatively use another topology structure. This is not limited in this embodiment.

Figure 18:
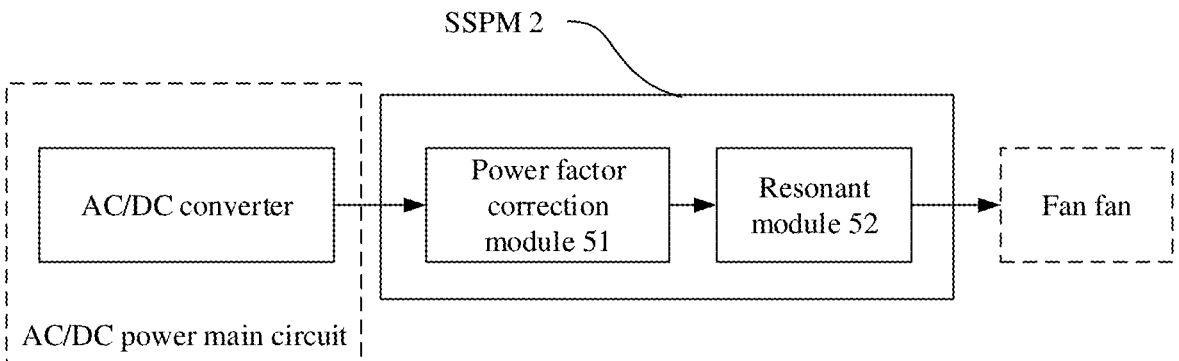
FIG. 18 is a schematic diagram of a structure of a second subsidiary power supply module SSPM 2 according to an embodiment.

As shown in FIG. 18, the second subsidiary power supply module SSPM 2 (which may be the second subsidiary power supply module SSPM 21 or the second subsidiary power supply module SSPM 22, that is, when the second subsidiary power supply circuit B includes the second subsidiary power supply module SSPM 21 and the second subsidiary power supply module SSPM 22, both the second subsidiary power supply module SSPM 21 and the second subsidiary power supply module SSPM 22 may use the structure shown in FIG. 18) may include a power factor correction module 51 and a resonant module 52.

Further, an input end of the power factor correction module 51 is coupled to the output end of the AC/DC power main circuit (which may be an AC/DC converter in the AC/DC power main circuit), an output end of the power factor correction module 51 is coupled to an input end of the resonant module 52, and an output end of the resonant module 52 is coupled to the fan.

It should be noted that, because both the second subsidiary power supply module SSPM 21 and the second subsidiary power supply module SSPM 22 may use the structure shown in FIG. 18, an output end of the AC/DC converter may be a positive output end DC11+ and a negative output end DC11− of the first AC/DC converter coupled to the second subsidiary power supply module SSPM 21, or may be a positive output end DC12+ and a negative output end DC12− of the second AC/DC converter coupled to the second subsidiary power supply module SSPM 22.

Figure 19:
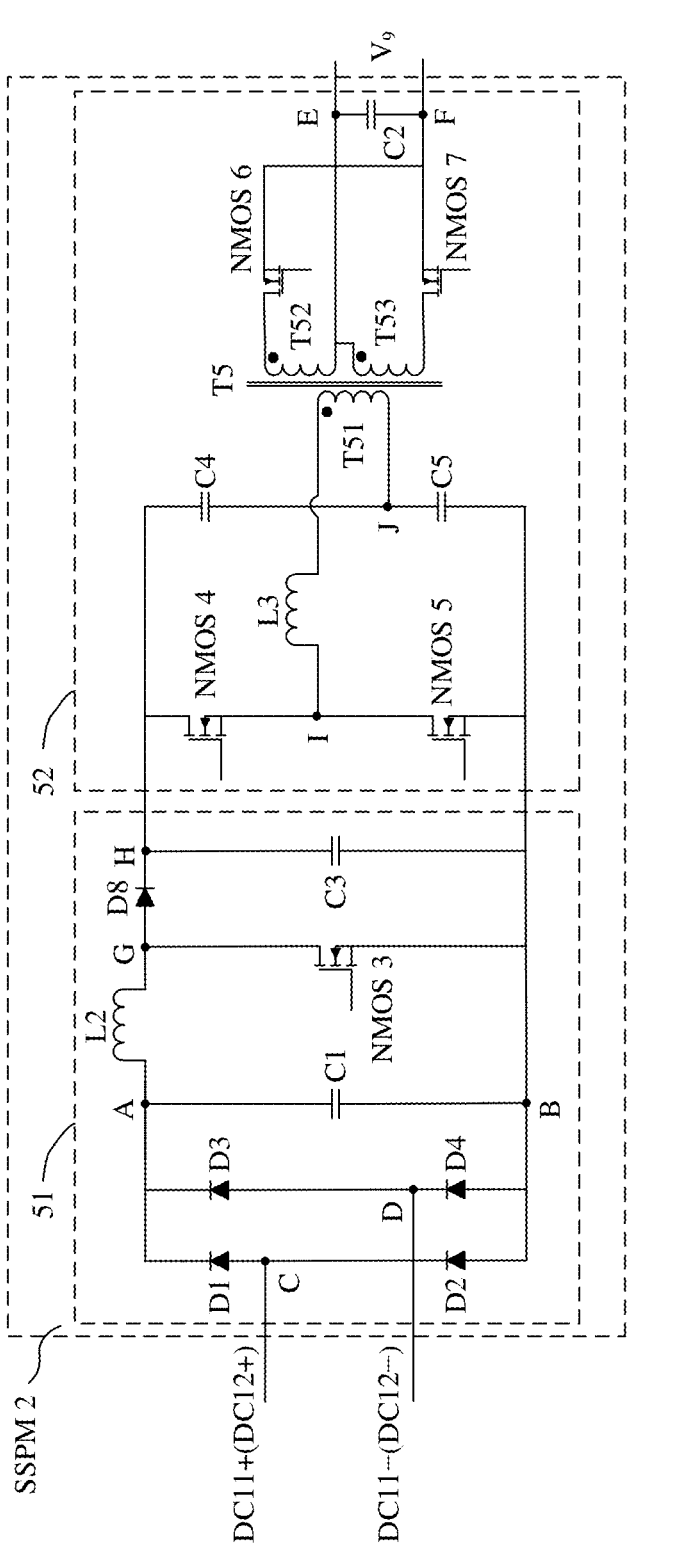
FIG. 19 is a schematic diagram of a structure of a second subsidiary power supply module SSPM 2 according to an embodiment.

In a possible implementation, the second subsidiary power supply module SSPM 2 may use the following two topology structures:

Structure 1: As shown in FIG. 19, the power factor correction module 51 includes a diode D1, a diode D2, a diode D3, a diode D4, a capacitor C1, an inductor L2, a diode D8, a third switching transistor (for example, an NMOS transistor in FIG. 19, that is, an NMOS 3 in FIG. 19), and a capacitor C3 (for implementing a rectification function). The resonant module 52 includes a fourth switching transistor (for example, an NMOS transistor in FIG. 19, that is, an NMOS 4 in FIG. 19), a fifth switching transistor (for example, an NMOS transistor in FIG. 19, that is, an NMOS 5 in FIG. 19), an inductor L3, a capacitor C4, a capacitor C5, a fifth transformer T5 (for implementing a step-down function, and including a primary side winding T51, an iron core, a secondary side winding T52, and a secondary side winding T53, where the primary side winding T51 is coupled to the secondary side winding T52 and the secondary side winding T53 by using the iron core), a first rectifier (for example, an NMOS transistor in FIG. 19, that is, an NMOS 6 in FIG. 19), and a second rectifier (for example, an NMOS transistor in FIG. 19, that is, an NMOS 7 in FIG. 19).

Further, referring to FIG. 19, in the power factor correction module 51, after the diode D1 and the diode D2 are connected in series, one end is coupled to a node A, and the other end is coupled to a node B. In addition, a connection point (a node C in FIG. 19) between the diode D1 and the diode D2 is coupled to the positive direct current end DC11+ (or the positive direct current end DC12+). After the diode D3 and the diode D4 are connected in series, one end is coupled to the node A, and the other end is coupled to the node B. In addition, a connection point (a node D in FIG. 19) between the diode D3 and the diode D4 is coupled to the negative direct current end DC11− (or the negative direct current end DC12−). Two ends of the capacitor C1 are respectively coupled to the node A and the node B. Herein, the diode D1 and the diode D2 connected in series, the diode D3 and the diode D4 connected in series, and the capacitor C1 may be connected in parallel. Two ends of the inductor L2 are respectively coupled to the node A and a node G. A source of the NMOS 3 and one end of the capacitor C3 are both coupled to the node B, a drain of the NMOS 3 is coupled to the node G, the other end of the capacitor C3 and a cathode of the diode D8 are both coupled to a node H, and an anode of the diode D8 is coupled to the node G.

Further, still referring to FIG. 19, in the resonant module 52, a drain of the NMOS 4 and one end of the capacitor C4 are both coupled to the node H, a source of the NMOS 4, one end of the inductor L3, and a drain of the NMOS 5 are all coupled to a node I, the other end of the capacitor C4 and one end of the capacitor C5 are both coupled to a node J, and the other end of the capacitor C5 and a source of the NMOS 5 are both coupled to the node B. A dotted terminal of the primary side winding T51 is coupled to the other end of the inductor L3, and a non-dotted terminal of the primary side winding T51 is coupled to the node J. A dotted terminal of the secondary side winding T52 is coupled to a drain of the NMOS 6, a non-dotted terminal of the secondary side winding T52 is coupled to a dotted terminal of the secondary side winding T53, and the non-dotted terminal of the secondary side winding T52 and the dotted terminal of the secondary side winding T53 are both coupled to a node E. A non-dotted terminal of the secondary side winding T53 is coupled to a drain of the NMOS 7, and a source of the NMOS 6 and a source of the NMOS 7 are coupled to a node F. The ninth voltage V₉ may be obtained by using the second subsidiary power supply module SSPM 2 shown in FIG. 19, and the second subsidiary power supply module SSPM 2 provides the ninth voltage V₉ to the fan (not shown in FIG. 19).

In a possible implementation, the third switching transistor in the power factor correction module 51, the fourth switching transistor, and the fifth switching transistor may alternatively be IGBTs respectively.

Optionally, when the third switching transistor is an IGBT, a collector of the IGBT is coupled to the node G, and an emitter of the IGBT is coupled to the node B.

Optionally, when the fourth switching transistor is an IGBT, a collector of the IGBT is coupled to the node H, and an emitter of the IGBT is coupled to the node I.

Optionally, when the fifth switching transistor is an IGBT, a collector of the IGBT is coupled to the node I, and an emitter of the IGBT is coupled to the node B.

In another possible implementation, the first rectifier and the second rectifier in the resonant module 52 may alternatively be diodes respectively.

Optionally, when the first rectifier is a diode, an anode of the diode is coupled to the node F, and a cathode of the diode is coupled to the dotted terminal of the secondary side winding T52.

Optionally, when the second rectifier is a diode, an anode of the diode is coupled to the node F, and a cathode of the diode is coupled to the non-dotted terminal of the secondary side winding T53.

Figure 20:
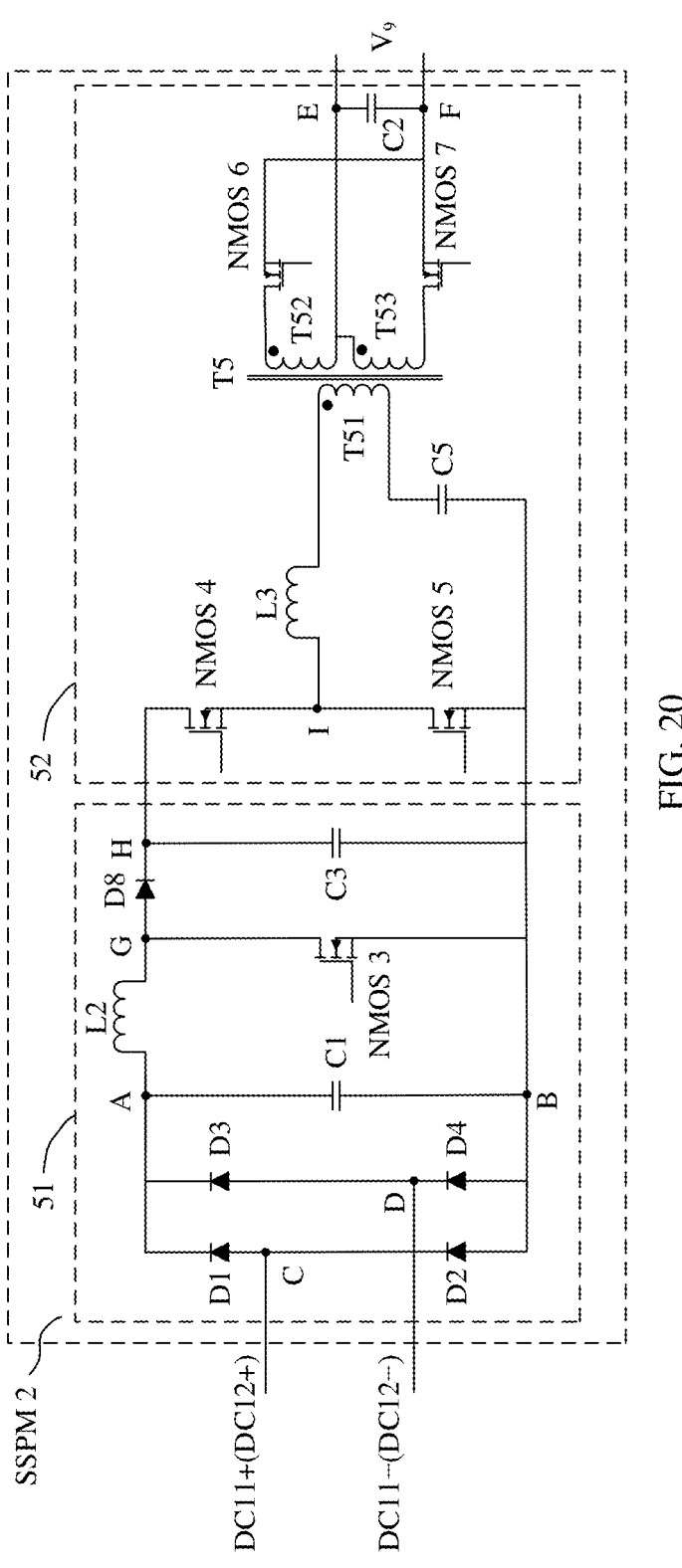
FIG. 20 is a schematic diagram of a structure of a second subsidiary power supply module SSPM 2 according to an embodiment.

Structure 2: As shown in FIG. 20, the power factor correction module 51 includes a diode D1, a diode D2, a diode D3, a diode D4, a capacitor C1, an inductor L2, a diode D8, a third switching transistor (for example, an NMOS transistor in FIG. 20, that is, an NMOS 3 in FIG. 20), and a capacitor C3 (for implementing a rectification function). The resonant module 52 includes a fourth switching transistor (for example, an NMOS transistor in FIG. 20, that is, an NMOS 4 in FIG. 20), a fifth switching transistor (for example, an NMOS transistor in FIG. 20, that is, an NMOS 5 in FIG. 20), an inductor L3, a capacitor C5, a fifth transformer T5 (for implementing a step-down function, and including a primary side winding T51, an iron core, a secondary side winding T52, and a secondary side winding T53, where the primary side winding T51 is coupled to the secondary side winding T52 and the secondary side winding T53 by using the iron core), a first rectifier (for example, an NMOS transistor in FIG. 20, that is, an NMOS 6 in FIG. 20), and a second rectifier (for example, an NMOS transistor in FIG. 20, that is, an NMOS 7 in FIG. 20).

Further, referring to FIG. 20, in the power factor correction module 51, after the diode D1 and the diode D2 are connected in series, one end is coupled to a node A, and the other end is coupled to a node B. In addition, a connection point (a node C in FIG. 20) between the diode D1 and the diode D2 is coupled to the positive direct current end DC11+ (or the positive direct current end DC12+). After the diode D3 and the diode D4 are connected in series, one end is coupled to the node A, and the other end is coupled to the node B. In addition, a connection point (a node D in FIG. 20) between the diode D3 and the diode D4 is coupled to the negative direct current end DC11− (or the negative direct current end DC12−). Two ends of the capacitor C1 are respectively coupled to the node A and the node B. Herein, the diode D1 and the diode D2 connected in series, the diode D3 and the diode D4 connected in series, and the capacitor C1 may be connected in parallel. Two ends of the inductor L2 are respectively coupled to the node A and a node G. A source of the NMOS 3 and one end of the capacitor C3 are both coupled to the node B, a drain of the NMOS 3 is coupled to the node G, the other end of the capacitor C3 and a cathode of the diode D8 are both coupled to a node H, and an anode of the diode D8 is coupled to the node G.

Further, still referring to FIG. 20, in the resonant module 52, a drain of the NMOS 4 is coupled to the node H, a source of the NMOS 4, one end of the inductor L3, and a drain of the NMOS 5 are all coupled to a node I, and a source of the NMOS 5 is coupled to the node B. A dotted terminal of the primary side winding T51 is coupled to the other end of the inductor L3, and a non-dotted terminal of the primary side winding T51 is coupled to the node B by using the capacitor C5. A dotted terminal of the secondary side winding T52 is coupled to a drain of the NMOS 6, a non-dotted terminal of the secondary side winding T52 is coupled to a dotted terminal of the secondary side winding T53, and the non-dotted terminal of the secondary side winding T52 and the dotted terminal of the secondary side winding T53 are both coupled to a node E. A non-dotted terminal of the secondary side winding T53 is coupled to a drain of the NMOS 7, and a source of the NMOS 6 and a source of the NMOS 7 are coupled to a node F. The ninth voltage V₉ may be obtained by using the second subsidiary power supply module SSPM 2 shown in FIG. 22, and the second subsidiary power supply module SSPM 2 provides the ninth voltage V₉ to the fan (not shown in FIG. 20).

In a possible implementation, the third switching transistor in the power factor correction module 51, the fourth switching transistor, and the fifth switching transistor may alternatively be IGBTs respectively.

Optionally, when the third switching transistor is an IGBT, a collector of the IGBT is coupled to the node G, and an emitter of the IGBT is coupled to the node B.

Optionally, when the fourth switching transistor is an IGBT, a collector of the IGBT is coupled to the node H, and an emitter of the IGBT is coupled to the node I.

Optionally, when the fifth switching transistor is an IGBT, a collector of the IGBT is coupled to the node I, and an emitter of the IGBT is coupled to the node B.

In another possible implementation, the first rectifier and the second rectifier in the resonant module 52 may alternatively be diodes respectively.

Optionally, when the first rectifier is a diode, an anode of the diode is coupled to the node F, and a cathode of the diode is coupled to the dotted terminal of the secondary side winding T52.

Optionally, when the second rectifier is a diode, an anode of the diode is coupled to the node F, and a cathode of the diode is coupled to the non-dotted terminal of the secondary side winding T53.

It should be noted that, in FIG. 19 and FIG. 20, an anode of the diode D1 and a cathode of the diode D2 are both coupled to the node C, and an anode of the diode D3 and a cathode of the diode D4 are both coupled to the node D, and a cathode of the diode D1 and a cathode of the diode D3 are both coupled to the node A, and an anode of the diode D2 and an anode of the diode D4 are both coupled to the node B.

It should also be noted that only two possible topology structures of the second subsidiary power supply module SSPM 21 and the second subsidiary power supply module SSPM 22 are provided in FIG. 19 and FIG. 20. The second subsidiary power supply module SSPM 21 and the second subsidiary power supply module SSPM 22 may alternatively use another topology structure. This is not limited in this embodiment.

It should be understood that, in the embodiments, sequence numbers of the foregoing processes do not mean execution sequences. The execution sequences of the processes should be determined based on functions and internal logic of the processes and should not constitute any limitation to implementation processes of the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on applications. A person skilled in the art may use different methods to implement the described functions for each application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit.

When the functions are implemented in a form of a software functional unit and sold or used as an independent product, the functions may be stored in a non-transitory computer-readable storage medium. Based on such an understanding, the embodiments essentially, or a part contributing to a current technology may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk drive, a read-only memory (ROM), a random access memory (RAM), a magnetic disk, or a compact disc.

The foregoing descriptions are merely implementations, but are not intended to limit the scope of the embodiments. Any variation or replacement readily figured out by a person skilled in the art shall fall within the scope of the embodiments.

What is claimed is:

1. A power unit comprising:

a first subsidiary power supply circuit; and a first power circuit, wherein the first power circuit comprises an alternating current/alternating current power main circuit and a first control module coupled to the alternating current/alternating current power main circuit;

an input end of the first subsidiary power supply circuit is coupled to a bus of the alternating current/alternating current power main circuit, an output end of the first subsidiary power supply circuit is coupled to the first control module, the alternating current/alternating current power main circuit comprises an input end and an output end, and the input end of the alternating current/alternating current power main circuit is coupled to a grid power supply system;

the alternating current/alternating current power main circuit is configured to adjust a voltage from the grid power supply system, and output the voltage through the output end of the alternating current/alternating current power main circuit;

the first control module is configured to detect at least one of a status or information of the alternating current/alternating current power main circuit, and drive the alternating current/alternating current power main circuit based on at least one of the status or information of the alternating current/alternating current power main circuit;

the first subsidiary power supply circuit is configured to adjust a voltage of the bus of the alternating current/alternating current power main circuit and output a direct current voltage to the first control module;

a first transformer; and a second power circuit that comprises an alternating current/direct current power main circuit and a second control module coupled to the alternating current/direct current power main circuit, and the alternating current/direct current power main circuit comprises an input end and an output end; wherein the first control module comprises a first communication circuit and is configured to transmit at least one of the status or information of the alternating current/alternating current power main circuit to the first communication circuit.

2. The power unit according to claim 1, wherein an input end of the first transformer is coupled to the output end of the alternating current/alternating current power main circuit, and an output end of the first transformer is coupled to the input end of the alternating current/direct current power main circuit;

the first transformer is configured to adjust the voltage input by the alternating current/alternating current power main circuit, and output a voltage to the alternating current/direct current power main circuit;

the alternating current/direct current power main circuit is configured to rectify the voltage input by the alternating current/direct current power main circuit, and output a direct current voltage through the output end of the alternating current/direct current power main circuit; and the second control module is configured to detect at least one of a status or information of the alternating current/direct current power main circuit and drive the alternating current/direct current power main circuit based on at least one of the status or information of the alternating current/direct current power main circuit.

3. The power unit according to claim 2, wherein the first control module comprises a first detection circuit, a first control circuit, and a first drive circuit, wherein an input end of the first detection circuit is coupled to the alternating current/alternating current power main circuit, an output end of the first detection circuit is coupled to an input end of the first control circuit, an output end of the first control circuit is coupled to an input end of the first drive circuit, an output end of the first drive circuit is coupled to the alternating current/alternating current power main circuit, the first control circuit is further coupled to the first communication circuit, and the first communication circuit is coupled to the second control module;

the first detection circuit is configured to detect at least one of the status or information of the alternating current/alternating current power main circuit;

the first communication circuit is configured to transmit the at least one of the status or information of the alternating current/alternating current power main circuit to the second control module, and transmit at least one of the status or information of the alternating current/direct current power main circuit from the second control module to the first control circuit;

the first control circuit is further configured to send a first control command to the first drive circuit based on at least one of the status or information of the alternating current/alternating current power main circuit or at least one of the status or information of the alternating current/direct current power main circuit; and the first drive circuit is configured to drive the alternating current/alternating current power main circuit based on the first control command.

4. The power unit according to claim 3, wherein the second control module comprises a second detection circuit, a second communication circuit, a second control circuit, and a second drive circuit, wherein an input end of the second detection circuit is coupled to the alternating current/direct current power main circuit, an output end of the second detection circuit is coupled to an input end of the second control circuit, an output end of the second control circuit is coupled to an input end of the second drive circuit, an output end of the second drive circuit is coupled to the alternating current/direct current power main circuit, the second control circuit is further coupled to the second communication circuit, and the second communication circuit is coupled to the first communication circuit;

the second detection circuit is configured to detect at least one of the status or information of the alternating current/direct current power main circuit;

the second control circuit is configured to transmit at least one of the status or information of the alternating current/direct current power main circuit to the second communication circuit;

the second communication circuit is configured to transmit at least one of the status or information of the alternating current/direct current power main circuit to the first control circuit, and transmit at least one of the status or information of the alternating current/alternating current power main circuit from the first communication circuit to the second control circuit;

the second control circuit is further configured to send a second control command to the second drive circuit based on at least one of the status or information of the alternating current/direct current power main circuit and at least one of the status or information of the AC/AC power main circuit; and the second drive circuit is configured to drive the alternating current/direct current power main circuit based on the second control command.

5. The power unit according to claim 1, wherein the first subsidiary power supply circuit comprises a first voltage conversion module and a first rectifier module, wherein an input end of the first voltage conversion module is coupled to a bus of the power unit, an output end of the first voltage conversion module is coupled to an input end of the first rectifier module, and an output end of the first rectifier module is coupled to the first control module;

the first voltage conversion module is configured to convert a voltage of the bus of the power unit into an alternating current voltage, and output the alternating current voltage to the first rectifier module; and the first rectifier module is configured to rectify the input voltage, and output the voltage to the first control module, to supply power to the first control module.

6. The power unit according to claim 2, wherein a voltage value of the first power circuit is higher than a voltage value of the second power circuit.

7. A solid-state transformer, comprising a plurality of power units, wherein each of the plurality of power units comprising a first subsidiary power supply circuit, a first power circuit, a first transformer and a second power circuit;

the first power circuit comprises an alternating current/ alternating current power main circuit and a first control module coupled to the alternating current/alternating current power main circuit;

an input end of the first subsidiary power supply circuit is coupled to a bus of the alternating current/alternating current power main circuit, an output end of the first subsidiary power supply circuit is coupled to the first control module, the alternating current/alternating current power main circuit comprises an input end and an output end, and the input end of the alternating current/ alternating current power main circuit is coupled to a grid power supply system;

the alternating current/alternating current power main circuit is configured to adjust a voltage from the grid power supply system, and output the voltage through the output end of the alternating current/alternating current power main circuit;

the first control module is configured to detect at least one of a status or information of the alternating current/ alternating current power main circuit, and drive the alternating current/alternating current power main circuit based on at least one of the status or information of the alternating current/alternating current power main circuit;

the first subsidiary power supply circuit is configured to adjust a voltage of the bus of the alternating current/ alternating current power main circuit, and output a direct current voltage to the first control module; and the second power circuit comprises an alternating current/ direct current power main circuit and a second control module coupled to the alternating current/direct current power main circuit, and the alternating current/direct current power main circuit comprises an input end and an output end;

an input end of the first transformer is coupled to the output end of the alternating current/alternating current power main circuit, and an output end of the first transformer is coupled to the input end of the alternating current/direct current power main circuit;

the first transformer is configured to adjust the voltage input by the alternating current/alternating current power main circuit, and output a voltage to the alternating current/direct current power main circuit;

the alternating current/direct current power main circuit is configured to rectify the voltage input by the alternating current/direct current power main circuit, and output a direct current voltage through the output end of the alternating current/direct current power main circuit; and the second control module is configured to detect at least one of a status or information of the alternating current/ direct current power main circuit, and drive the alternating current/direct current power main circuit based on at least one of the status or information of the alternating current/direct current power main circuit; and the solid-state transformer further comprise a second subsidiary power supply circuit, wherein input ends of all of the plurality of power units are connected in series to form an input end of the solid-state transformer;

output ends of all of the plurality of power units are connected in parallel to form an output end of the solid-state transformer;

an input end of the second subsidiary power supply circuit is coupled to the output end of the alternating current/ direct current power main circuit, and an output end of the second subsidiary power supply circuit is coupled to the second control module; and the second subsidiary power supply circuit is configured to adjust the voltage input by the the alternating current/direct current power main circuit and output the voltage to the second control module.

8. The solid-state transformer according to claim 7, wherein the second subsidiary power supply circuit comprises a second transformer and a first subsidiary power supply module, wherein an input end of the second transformer is coupled to the grid power supply system, an output end of the second transformer is coupled to an input end of the first subsidiary power supply module, the input end of the first subsidiary power supply module is further coupled to the output end of the alternating current/direct current power main circuit, and an output end of the first subsidiary power supply module is coupled to the second control module;

the second transformer is configured to adjust the voltage input by the grid power supply system, and output the voltage to the first subsidiary power supply module; and the first subsidiary power supply module is configured to adjust the voltage to supply power to the second control module.

9. The solid-state transformer according to claim 8, wherein the power unit further comprises a fan, and the second subsidiary power supply circuit further comprises at least one second subsidiary power supply module, wherein an input end of each of the at least one second subsidiary power supply module is coupled to the output end of the alternating current/direct current power main circuit, and an output end of each second subsidiary power supply module is coupled to the fan; and each second subsidiary power supply module is configured to adjust a voltage and output the voltage to the fan.

10. The solid-state transformer according to claim 9, wherein output power of the second transformer is higher than output power of the first subsidiary power supply module; and the output power of the first subsidiary power supply module is lower than output power of each second subsidiary power supply module.

11. The solid-state transformer according to claim 9, wherein each second subsidiary power supply module comprises a power factor correction module and a resonant module, wherein an input end of the power factor correction module is coupled to the output end of the alternating current/ direct current power main circuit, an output end of the power factor correction module is coupled to an input end of the resonant module, and an output end of the resonant module is coupled to the fan;

the resonant module is configured to convert the voltage and output the voltage to the fan.

12. The solid-state transformer according to claim 8, wherein the first subsidiary power supply module comprises a second rectifier module, a backflow prevention module, a second voltage conversion module, and a third rectifier module, wherein an input end of the backflow prevention module is coupled to the output end of the alternating current/ direct current power main circuit, an output end of the backflow prevention module is coupled to an input end of the second rectifier module, the input end of the second rectifier module is further coupled to the output end of the second transformer, an output end of the second rectifier module is coupled to an input end of the second voltage conversion module, an output end of the second voltage conversion module is coupled to an input end of the third rectifier module, and an output end of the third rectifier module is coupled to the second control module;

the backflow prevention module is configured to prevent a voltage from backflowing to the alternating current/direct current power main circuit.

13. The solid-state transformer according to claim 12, wherein the backflow prevention module comprises a first switching transistor.

14. The solid-state transformer according to claim 13, wherein the first switching transistor is a diode, a triode, or a field effect transistor, wherein when the first switching transistor is a diode, an anode of the diode is coupled to the output end of the alternating current/direct current power main circuit, and a cathode of the diode is coupled to the input end of the second rectifier module;

when the first switching transistor is a triode, a collector of the triode is coupled to the output end of the alternating current/direct current power main circuit, and an emitter of the triode is coupled to the input end of the second rectifier module; or when the first switching transistor is a field effect transistor, a source of the field effect transistor is coupled to the output end of the alternating current/direct current power main circuit, and a drain of the field effect transistor is coupled to the input end of the second rectifier module.

15. The solid-state transformer according to claim 7, wherein the first control module comprises a first detection circuit, a first communication circuit, a first control circuit, and a first drive circuit, wherein an input end of the first detection circuit is coupled to the alternating current/alternating current power main circuit, an output end of the first detection circuit is coupled to an input end of the first control circuit, an output end of the first control circuit is coupled to an input end of the first drive circuit, an output end of the first drive circuit is coupled to the alternating current/alternating current power main circuit, the first control circuit is further coupled to the first communication circuit, and the first communication circuit is coupled to the second control module;

the first detection circuit is configured to detect at least one of the status or information of the alternating current/alternating current power main circuit;

the first control circuit is configured to transmit at least one of the status or information of the alternating current/alternating current power main circuit to the first communication circuit;

the first communication circuit is configured to transmit at least one of the status or information of the alternating current/alternating current power main circuit to the second control module, and transmit at least one of the status or information of the alternating current/direct current power main circuit from the second control module to the first control circuit;

the first control circuit is further configured to send a first control command to the first drive circuit based on at least one of the status or information of the alternating current/alternating current power main circuit or at least one of the status or information of the alternating current/direct current power main circuit; and the first drive circuit is configured to drive the alternating current/alternating current power main circuit based on the first control command.

16. The solid-state transformer according to claim 15, wherein the second control module comprises a second detection circuit, a second communication circuit, a second control circuit, and a second drive circuit, wherein an input end of the second detection circuit is coupled to the alternating current/direct current power main circuit, an output end of the second detection circuit is coupled to an input end of the second control circuit, an output end of the second control circuit is coupled to an input end of the second drive circuit, an output end of the second drive circuit is coupled to the alternating current/direct current power main circuit, the second control circuit is further coupled to the second communication circuit, and the second communication circuit is coupled to the first communication circuit;

the second detection circuit is configured to detect at least one of the status or information of the alternating current/direct current power main circuit;

the second control circuit is configured to transmit at least one of the status or information of the alternating current/direct current power main circuit to the second communication circuit;

the second communication circuit is configured to transmit at least one of the status or information of the alternating current/direct current power main circuit to the first control circuit, and transmit at least one of the status or information of the alternating current/alternating current power main circuit from the first communication circuit to the second control circuit;

the second control circuit is further configured to send a second control command to the second drive circuit based on at least one of the status or information of the alternating current/direct current power main circuit and at least one of the status or information of the AC/AC power main circuit; and the second drive circuit is configured to drive the alternating current/direct current power main circuit based on the second control command.

17. The solid-state transformer according to claim 7, wherein the first subsidiary power supply circuit comprises a first voltage conversion module and a first rectifier module, wherein an input end of the first voltage conversion module is coupled to a bus of the power unit, an output end of the first voltage conversion module is coupled to an input end of the first rectifier module, and an output end of the first rectifier module is coupled to the first control module;

the first voltage conversion module is configured to convert a voltage of the bus of the power unit into an alternating current voltage, and output the alternating current voltage to the first rectifier module; and the first rectifier module is configured to rectify the input voltage, and output the voltage to the first control module, to supply power to the first control module.

18. The solid-state transformer according to claim 7, wherein a voltage value of the first power circuit is higher than a voltage value of the second power circuit.

19. The solid-state transformer according to claim 10, wherein each second subsidiary power supply module comprises a power factor correction module and a resonant module, wherein an input end of the power factor correction module is coupled to the output end of the alternating current/direct current power main circuit, an output end of the power factor correction module is coupled to an input end of the resonant module, and an output end of the resonant module is coupled to the fan; the resonant module is configured to convert the voltage and output the voltage to the fan.

20. The solid-state transformer according to claim 8, wherein the first subsidiary power supply circuit comprises a first voltage conversion module and a first rectifier module, wherein an input end of the first voltage conversion module is coupled to a bus of the power unit, an output end of the first voltage conversion module is coupled to an input end of the first rectifier module, and an output end of the first rectifier module is coupled to the first control module;

the first voltage conversion module is configured to convert a voltage of the bus of the power unit into an alternating current voltage, and output the alternating current voltage to the first rectifier module; and the first rectifier module is configured to rectify the input voltage, and output the voltage to the first control module, to supply power to the first control module.

* * * * *